US011554711B2

(12) United States Patent
Noble et al.

(10) Patent No.: US 11,554,711 B2
(45) Date of Patent: Jan. 17, 2023

(54) COLLAPSIBLE BULKHEADS AND FLATBED TRAILERS

(71) Applicant: Chrome Deposit Corporation, Weirton, WV (US)

(72) Inventors: Craig A. Noble, Georgetown, PA (US); Derric Abney, Middletown, PA (US); Robert Hiler, Richfield, OH (US)

(73) Assignee: CHROME DEPOSIT CORPORATION, Weirton, WV (US)

( * ) Notice: Subject to any disclaimer, the term of this patent is extended or adjusted under 35 U.S.C. 154(b) by 326 days.

(21) Appl. No.: 17/000,818

(22) Filed: Aug. 24, 2020

(65) Prior Publication Data

US 2021/0061162 A1   Mar. 4, 2021

Related U.S. Application Data

(60) Provisional application No. 62/891,646, filed on Aug. 26, 2019.

(51) Int. Cl.
| | | |
|---|---|---|
| *B60P 7/14* | (2006.01) | |
| *B60P 7/12* | (2006.01) | |
| *B62D 29/00* | (2006.01) | |
| *B62D 53/06* | (2006.01) | |
| *B62D 63/08* | (2006.01) | |

(52) U.S. Cl.
CPC ...... *B60P 7/14* (2013.01); *B60P 7/12* (2013.01); *B62D 29/008* (2013.01); *B62D 53/061* (2013.01); *B62D 53/067* (2013.01); *B62D 63/08* (2013.01)

(58) Field of Classification Search
CPC .... B62D 53/061; B62D 53/067; B62D 63/08; B62D 29/008; B62D 61/00; B62D 88/129; B60P 7/12; B60P 7/14; B61D 45/003; B61D 45/004
See application file for complete search history.

(56) References Cited

U.S. PATENT DOCUMENTS

| | | | | |
|---|---|---|---|---|
| 3,460,684 | A * | 8/1969 | Almasy .................. | B21C 47/24 410/121 |
| 3,493,263 | A * | 2/1970 | Brown ..................... | B60P 7/14 296/186.1 |
| 3,876,173 | A * | 4/1975 | Cline ....................... | B60P 7/12 188/32 |
| 4,247,237 | A * | 1/1981 | Brown ..................... | B60P 7/14 428/116 |
| 5,009,564 | A * | 4/1991 | Lutz ......................... | B60P 7/14 414/512 |
| 5,085,382 | A * | 2/1992 | Finkenbeiner ........... | B64D 9/00 188/371 |
| 5,154,556 | A * | 10/1992 | Wappel .................. | F17C 13/084 410/97 |
| 5,217,184 | A * | 6/1993 | Hararat-Tehrani ....... | B64D 9/00 410/121 |
| 5,386,674 | A * | 2/1995 | Sfirakis ................ | B61D 45/006 49/503 |

(Continued)

*Primary Examiner* — Gregory A Blankenship
(74) *Attorney, Agent, or Firm* — Norris McLaughlin, P.A.

(57) ABSTRACT

One or more flatbed trailers, load placement devices and/or collapsible bulkheads are provided. The flatbed trailer may have a lowered center of gravity and may comprise a plurality of load placement devices and a collapsible and/or crushable bulkhead disposed on a deck of the flatbed trailer to provide improved load transportation safety.

19 Claims, 34 Drawing Sheets

(56) References Cited

U.S. PATENT DOCUMENTS

| | | | | |
|---|---|---|---|---|
| 8,366,361 | B1* | 2/2013 | Landrum | B61D 3/16 |
| | | | | 410/47 |
| 8,398,343 | B1* | 3/2013 | Henley | B61D 45/008 |
| | | | | 410/32 |
| 9,387,788 | B1* | 7/2016 | Stroup | B60J 7/085 |
| 9,638,162 | B1* | 5/2017 | Fletcher | B60P 1/6409 |
| 10,132,911 | B1* | 11/2018 | Bullock | B60P 7/15 |
| 10,144,336 | B1* | 12/2018 | Wadsworth | B60P 7/12 |
| 2002/0076289 | A1* | 6/2002 | Al-Kaabi | B61D 45/003 |
| | | | | 410/47 |
| 2005/0135895 | A1* | 6/2005 | Valentine | F41A 9/87 |
| | | | | 410/50 |
| 2007/0098514 | A1* | 5/2007 | Adams | B60P 7/15 |
| | | | | 410/23 |
| 2011/0274511 | A1* | 11/2011 | Ferrari | B60P 3/035 |
| | | | | 410/49 |
| 2014/0271022 | A1* | 9/2014 | Ridgeway | B60P 7/14 |
| | | | | 410/121 |
| 2016/0039328 | A1* | 2/2016 | Boisture | B60P 7/12 |
| | | | | 414/412 |
| 2017/0217450 | A1* | 8/2017 | Thompson | B61D 45/003 |
| 2017/0253169 | A1* | 9/2017 | Keller | F03D 13/40 |
| 2020/0324965 | A1* | 10/2020 | Joyce | B65D 90/0053 |
| 2020/0384908 | A1* | 12/2020 | Wilkerson | B60P 7/12 |
| 2021/0061162 | A1* | 3/2021 | Noble | B62D 53/067 |

* cited by examiner

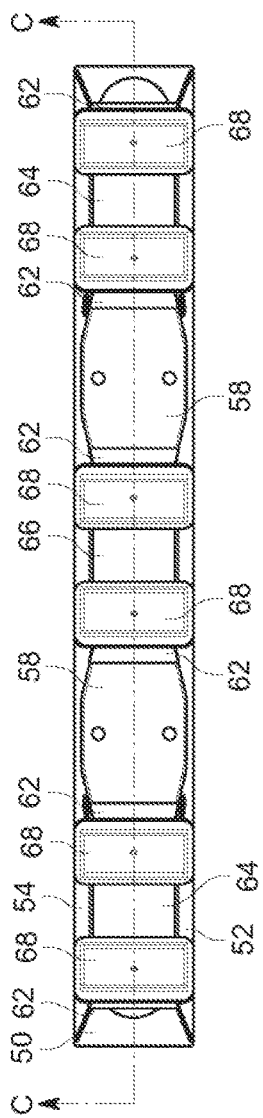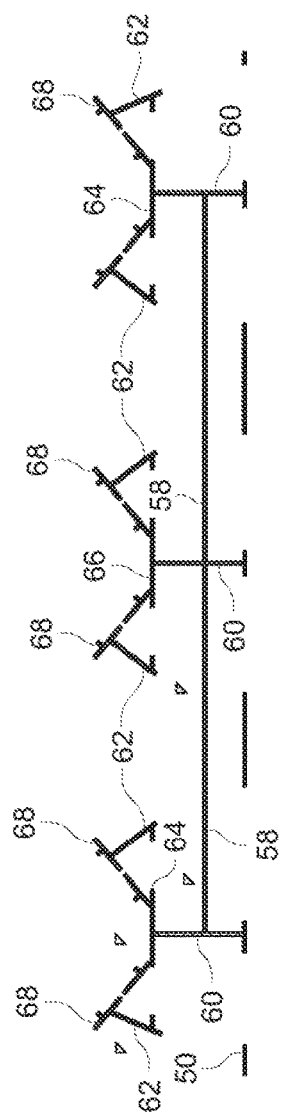
FIG. 9A
FIG. 9B
FIG. 9C

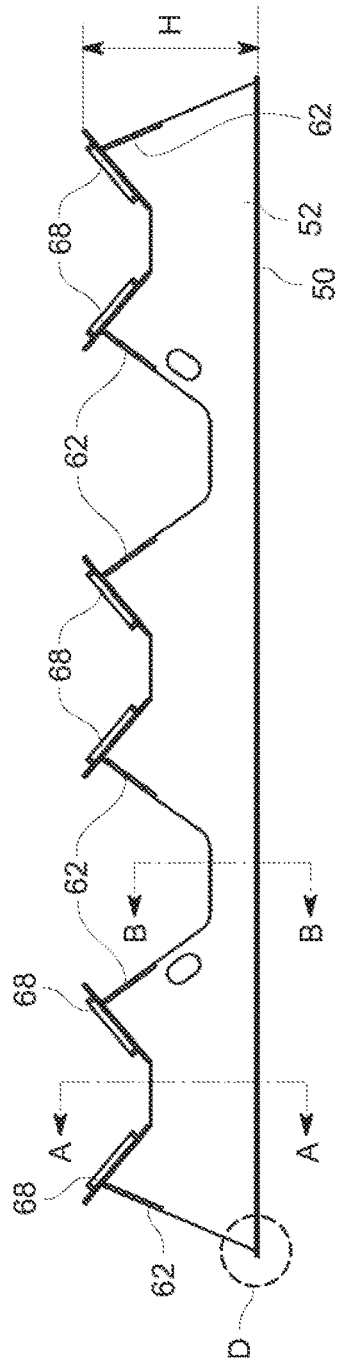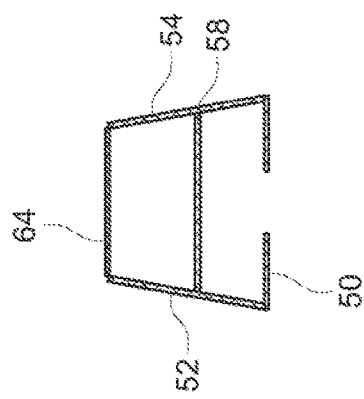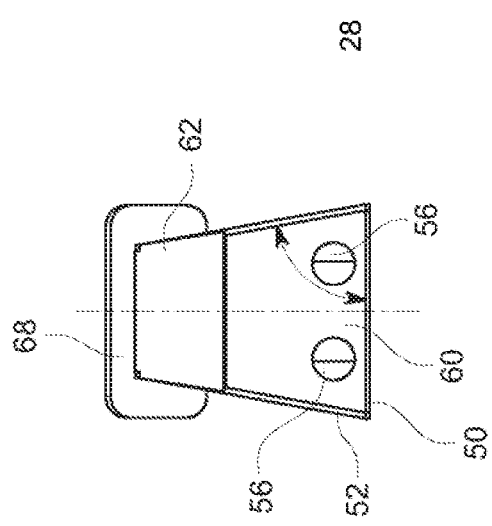

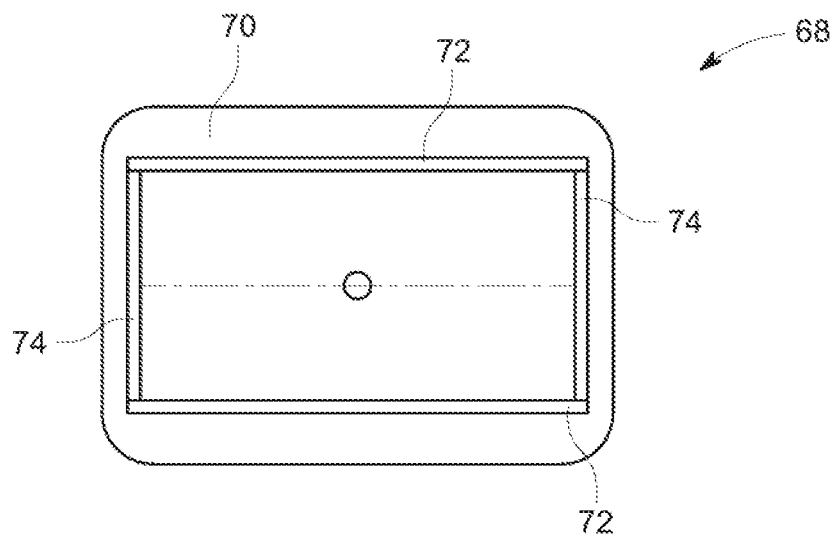
FIG. 9K
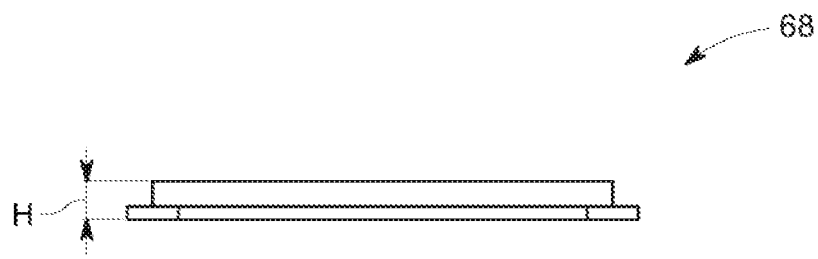
FIG. 9L
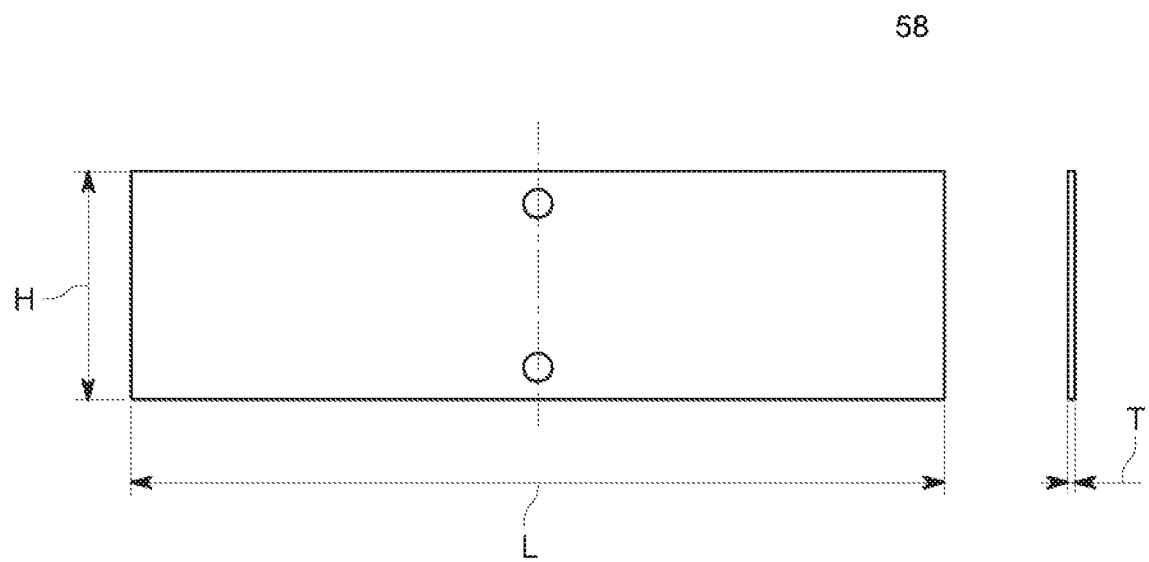
FIG. 9M
FIG. 9N

56

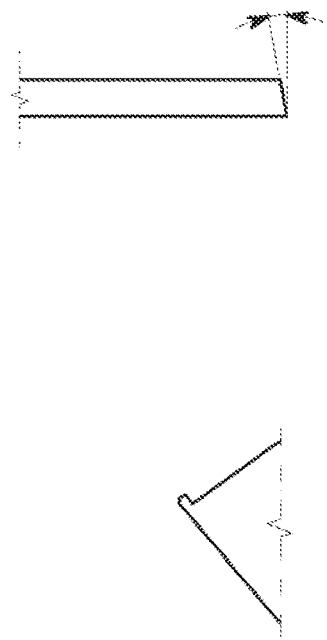
FIG. 9AB
FIG. 9AC
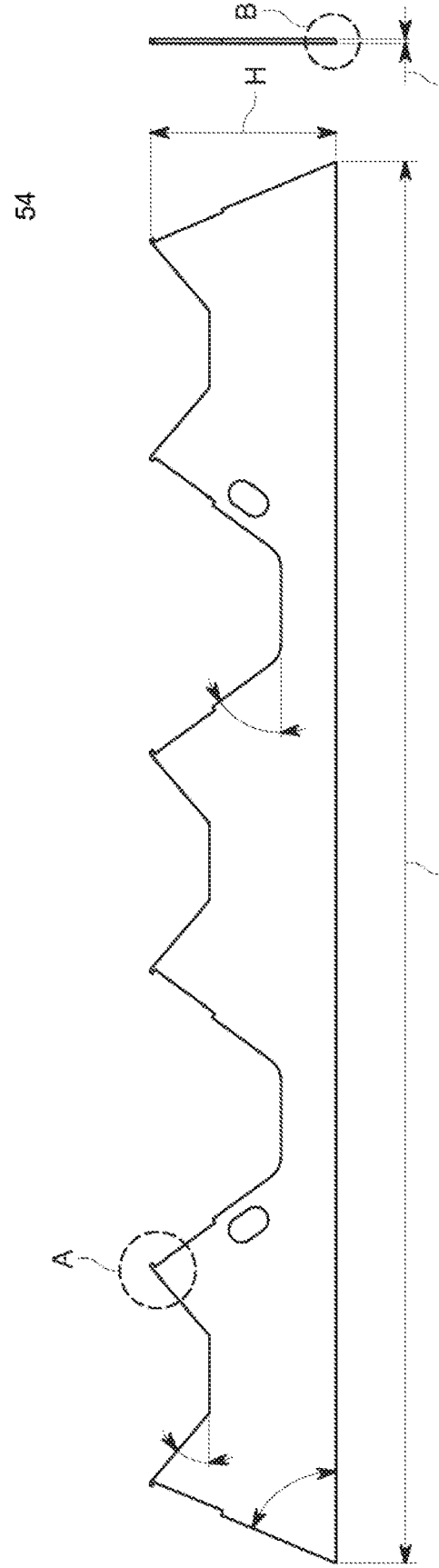
FIG. 9AD
FIG. 9AE

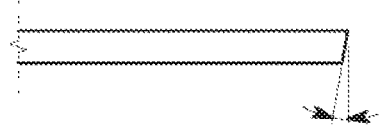
FIG. 9AE
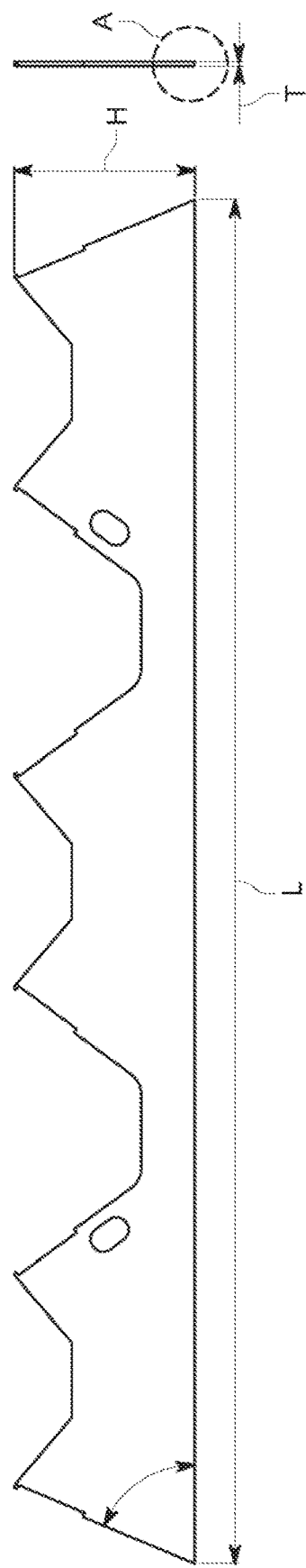
FIG. 9AF
FIG. 9AG

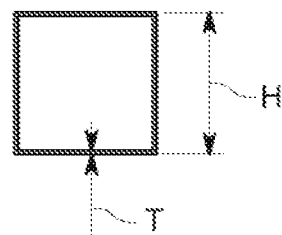
FIG. 10E  FIG. 10F
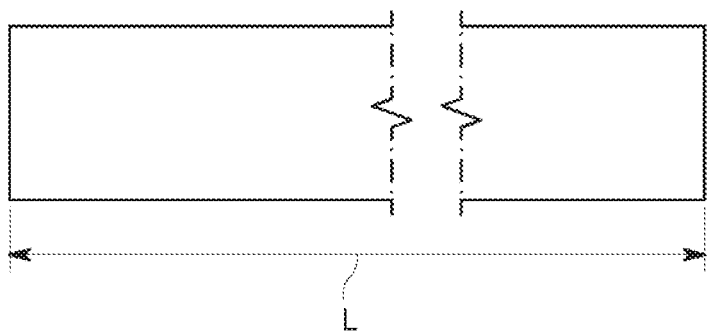
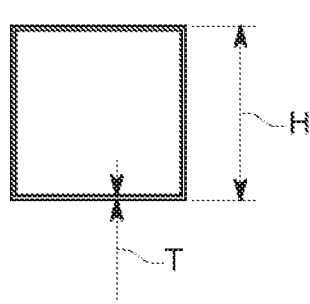
FIG. 10G  FIG. 10H

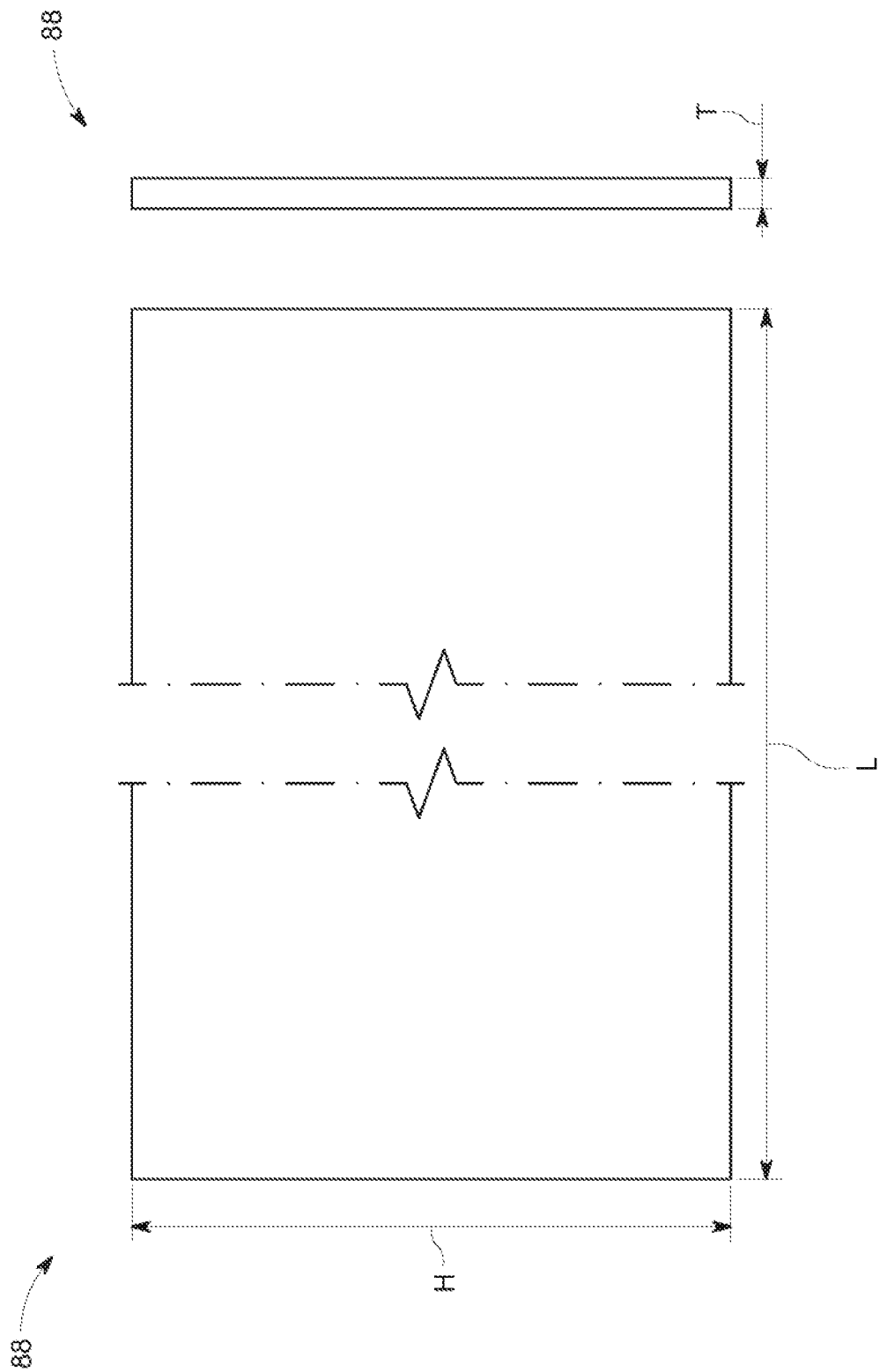

COLLAPSIBLE BULKHEADS AND FLATBED TRAILERS

FIELD OF THE DISCLOSURE

The present disclosure is directed to novel and inventive collapsible and/or crushable bulkheads and flatbed trailers. Systems and methods disclosed hereinafter comprise a flatbed trailer having a lowered center of gravity, one or more load placement devices and/or at least one collapsible and/or crushable bulkhead.

SUMMARY OF THE DISCLOSURE

In embodiments, a flatbed trailer system may have a trailer comprising a total length defined between a front end and a rear end located opposite with respect to the front end of the trailer, a total width defined between a first side and a second side located opposite with respect to the first side of the trailer, and a deck or a decking disposed on a top side of the trailer and along at least a portion of the length of trailer. The trailer may also have a bulkhead connected to the top side of the trailer, disposed adjacent to the front end of the trailer, and comprising a first side plate, a second side plate, and at least one honeycomb structure disposed between the first side plate and the second side plate such that the at least one honeycomb structure connects the first side plate to the second side plate, wherein at least a portion of the at least one honeycomb structure is made of one or more materials having at least one of a crushable property and a collapsible property.

In an embodiment, the at least one honeycomb structure may have cross tubes extending between the first side plate and the second side plate such that the cross tubes extend across at least a portion of the width of the trailer.

In an embodiment, the bulkhead may further have at least one vertical tube disposed between the cross tubes and the first plate.

In an embodiment, the cross tubes may have at least three cross tubes.

In an embodiment, the bulkhead may further have at least one cross plate connecting the cross tubes together such that at least one void or space is provided between each cross tube of the cross tubes.

In an embodiment, the bulkhead further have at least one vertical tube disposed between the at least one cross plate and the first plate.

In an embodiment, the at least one void or space may face away from the rear end of the trailer.

In an embodiment, the bulkhead may further have a bolt plate connecting the first side plate to the deck or the decking of the trailer.

In an embodiment, the one or more materials may be selected from the group consists of at least one of a hardened alloy, a pre-tempered alloy, and a combination thereof.

In an embodiment, the one or more materials may be selected from the group consisting of at least one of aluminum, magnesium, silicon, and a combination thereof.

In embodiments, a flatbed trailer system may have a trailer comprising a total length defined between a front end and a rear end located opposite with respect to the front end of the trailer, a total width defined between a first side and a second side located opposite with respect to the first side of the trailer, and a deck or a decking disposed on a top side of the trailer and along at least a portion of the length of trailer. The flatbed trailer system may have a load placement device connected to the top side of the trailer, disposed between the front end and the rear end of the trailer, and comprising a bottom plate configured for fastening the load placement device to the deck or the decking of the trailer, an inner plate connected to the bottom plate, and at least one pair of roll blocks connected to the inner plate such that the inner plate is disposed between the bottom plate and the at least one pair roll blocks, wherein at least one void or space is disposed between the at least one pair of roll blocks and configured to receive a load and maintain the load at a distance away from the deck or the decking of the trailer, wherein at least one surface of the at least one pair of roll blocks is angled with respect to the bottom plate and the inner plate and configured to contact the load, when the load has been received by the at least one pair of roll blocks.

In an embodiment, the top side of the trailer may have fastener locations for connecting the load placement device to the trailer.

In an embodiment, the flatbed trailer system may further have at least one fastener engaging the bottom plate of the load placement device and a fastener location of the fastener locations such that the at least one fastener connects the load placement device to the trailer.

In an embodiment, the load placement device may extend across at least a portion of the total width of the trailer.

In an embodiment, each roll block of the at least one pair of roll blocks may be a chock.

In an embodiment, at least one void or space may be V-shaped.

In an embodiment, each roll block of the at least one pair of roll blocks may have a base plate having a surface facing away from the bottom plate of the load placement device, first block retainers disposed on the surface of the base plate, and second block retainers disposed on the surface of the base plate, wherein the first and second block retainers form the at least one surface that is angled with respect to the bottom plate and the inner plate and configured to contact the load, when the load has been received by the at least one pair of roll blocks.

In an embodiment, each roll block of the at least one pair of roll blocks may be a chock comprising the base plate and the first and second block retainers.

In an embodiment, the flatbed trailer system may further have a crushable and/or collapsible bulkhead connected to the top side of the trailer, disposed adjacent to the front end of the trailer, and comprising cross tubes extending across at least a portion of the total width of the trailer.

In embodiments, a method of improving safety associated with transporting a load on a flatbed trailer may be provided. The method may dispose a crushable and/or collapsible bulkhead at a front end of a flatbed trailer, wherein the crushable and/or collapsible bulkhead comprises cross tubes extending across at least a portion of a total width of the flatbed trailer and the cross tubes are made of one or more materials having at least one of a crushable property and a collapsible property, dispose a load placement device on a deck of the flatbed trailer between the front end of the flatbed trailer and an opposite rear end of the flatbed trailer, and dispose a load into a void or space of the load placement device such that the load placement device maintains a distance between the deck of the flatbed trailer and the load.

In an embodiment, the load placement device may be a pair of chocks.

BRIEF DESCRIPTION OF THE DRAWINGS

The foregoing and other features of the present disclosure will become more fully apparent from the following description and appended claims, taken in conjunction with the accompanying drawings. Understanding that these drawings depict several embodiments in accordance with the disclosure and are, therefore, not to be considered limiting of its scope, the disclosure will be described with additional specificity and detail through use of the accompanying drawings.

FIG. 9B is a cross-sectional view along line C-C of the movable load placement device illustrated in FIG. 9A in accordance with embodiments disclosed herein.

FIG. 9C is a top perspective view of a movable load placement device in accordance with embodiments disclosed herein.

FIG. 9D is a side plan view of a movable load placement device in accordance with embodiments disclosed herein.

FIG. 9E is a front plan view of a movable load placement device in accordance with embodiments disclosed herein.

FIG. 9F is a cross-sectional view along line A-A of the movable load placement device illustrated in FIG. 9D in accordance with embodiments disclosed herein.

FIG. 9K is a top plan view of a roll block of a movable load placement device in accordance with embodiments disclosed herein.

FIG. 9L is a side plan view of a roll block of a movable load placement device in accordance with embodiments disclosed herein.

FIG. 9M is a top plan view of a COMPONENT1 of a movable load placement device in accordance with embodiments disclosed herein.

FIG. 9N is a side plan view of a COMPONENT1 of a movable load placement device in accordance with embodiments disclosed herein.

FIG. 9AA is a top plan view of a bottom plate of a movable load placement device in accordance with embodiments disclosed herein.

FIG. 9AB is a side section view of a first main side plate of a movable load placement device in accordance with embodiments disclosed herein.

FIG. 9AC is a side section view of a first main side plate of a movable load placement device in accordance with embodiments disclosed herein.

FIG. 9AD is a front plan view of a first main side plate of a movable load placement device in accordance with embodiments disclosed herein.

FIG. 9AE is a side plan view of a first main side plate of a movable load placement device in accordance with embodiments disclosed herein.

FIG. 9AF is a front plan view of a second main side plate of a movable load placement device in accordance with embodiments disclosed herein.

FIG. 9AG is a side plan view of a second main side plate of a movable load placement device in accordance with embodiments disclosed herein.

FIG. 9AH is a top plan view of a COMPONENT8 of a movable load placement device in accordance with embodiments disclosed herein.

FIG. 9AI is a top plan view of a COMPONENT8 of a movable load placement device in accordance with embodiments disclosed herein.

FIG. 9AJ is a top plan view of a COMPONENT9 of a movable load placement device in accordance with embodiments disclosed herein.

FIG. 9AK is a top plan view of a COMPONENT9 of a movable load placement device in accordance with embodiments disclosed herein.

FIG. 10E is a top plan view of a vertical tube of a collapsible and/or crushable bulkhead in accordance with embodiments disclosed herein.

FIG. 10F is a side plan view of a vertical tube of a collapsible and/or crushable bulkhead in accordance with embodiments disclosed herein.

FIG. 10G is a top plan view of a cross tube of a collapsible and/or crushable bulkhead in accordance with embodiments disclosed herein.

FIG. 10H is a side plan view of a cross tube of a collapsible and/or crushable bulkhead in accordance with embodiments disclosed herein.

FIG. 10K is a top plan view of a back cross plate of a collapsible and/or crushable bulkhead in accordance with embodiments disclosed herein.

FIG. 10L is a side plan view of a back cross plate of a collapsible and/or crushable bulkhead in accordance with embodiments disclosed herein.

DETAILED DESCRIPTION

Figure 1:
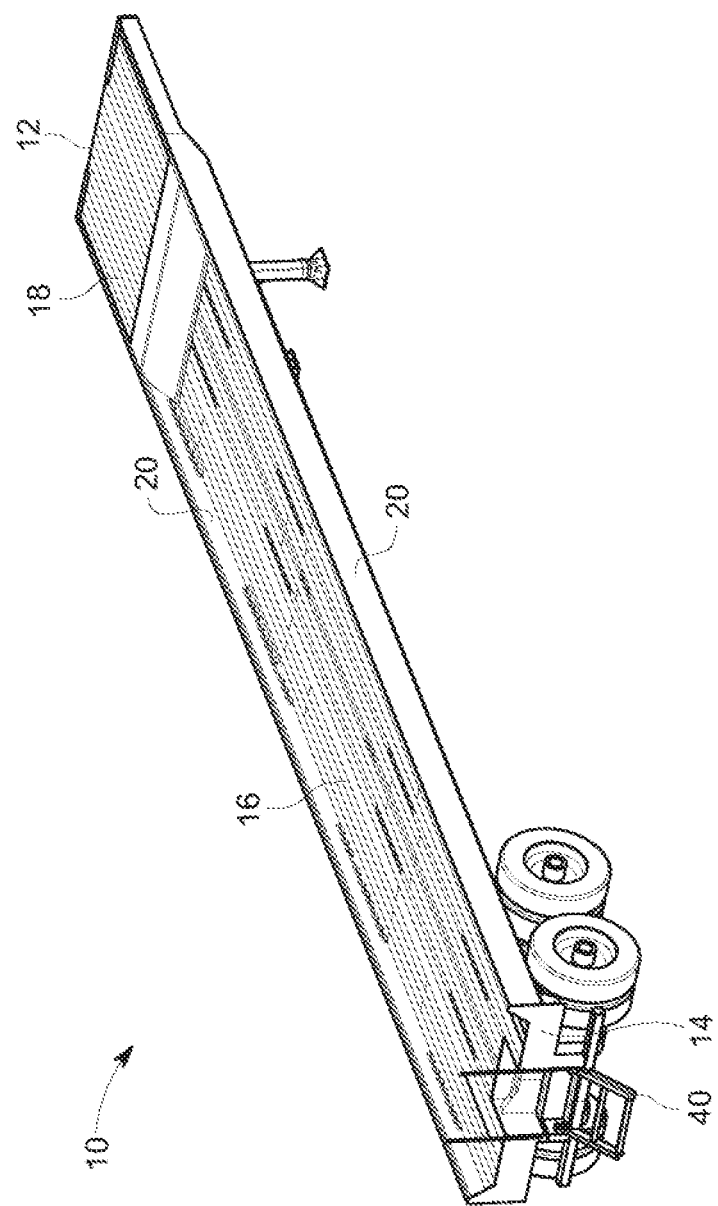
FIG. 1 is a side perspective view of a flatbed trailer in accordance with embodiments disclosed herein.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation. Furthermore, same reference numerals may refer to same, or substantially the same, structural features and/or components throughout the drawings accompanying the present disclosure.

FIGS. 1-8 illustrate a flatbed trailer 10 (hereinafter "trailer 10") having a lower center of gravity and side rails 20 (hereinafter "rails 20") extending upwardly and away from a floor or deck 16 (hereinafter "deck 16") of the trailer 10. The trailer 10 has a front end 12 and a rear end 14 located opposite with respect to the front end 12 of the trailer 10. At least one of the deck 16 and/or one or more of the rails 20 may extend from or between the front end 12 and the rear end 14 of the trailer 10. The deck 16 may comprise at least one decking 18 which may extend up to or between the front end 12, the rear end 14, and/or the rails 20. Moreover, the rails 20 may have a bottom edge 22 which may be adjacent to the deck 16 of the trailer 10 and/or the decking 18 of the deck 16. In embodiments, the bottom edge 22 of the rails 20 may contact, abut, and/or terminate at the deck 16 of the trailer 10 and/or the decking 18 of the deck 16. As a result, the center of gravity of the trailer 10 is lower than known flatbed trailers.

In embodiments, a plurality of stairs 40 (hereinafter "stairs 40") may be disposed at, near or adjacent to the rear end 16 of the trailer 10 as shown in at least FIGS. 1 and 3. The stairs are configured for and adapted to provide access to the deck 16 of the trailer 10 and/or the decking 18 of the deck 16. The decking 18 may be disposed at, near, or adjacent to the front end 12 of the trailer as shown in FIG. 1 such that the decking 18 may contact, about and/or terminated at a top end of the rails 20.

Figure 2:
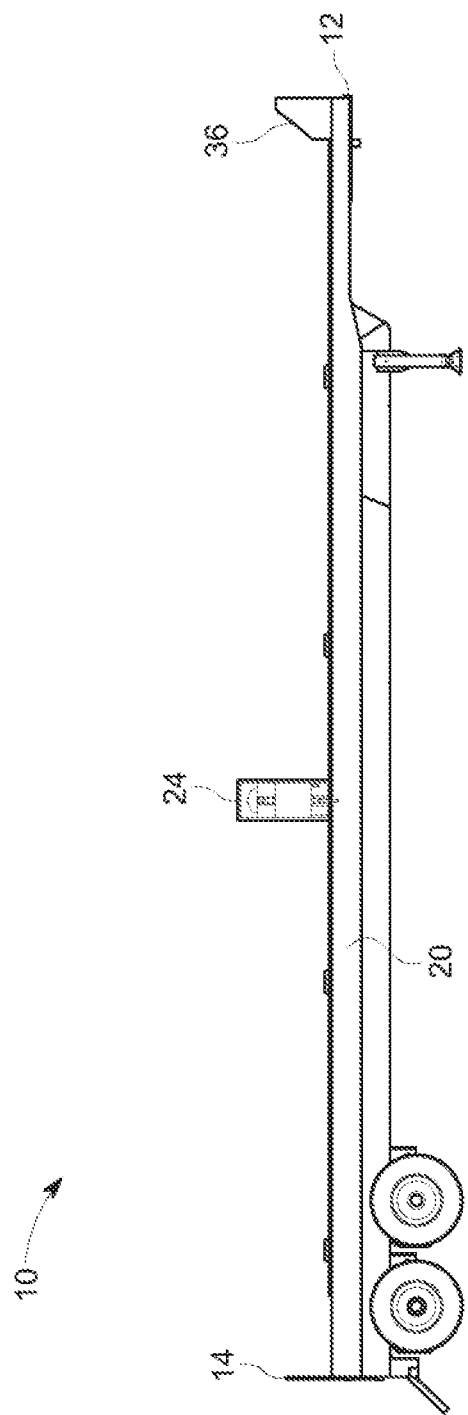
FIG. 2 is a side plan view of a flatbed trailer in accordance with embodiments disclosed herein.

FIG. 2 is a side view of the trailer 10 having a collapsible and/or crushable bulkhead 36 (hereinafter "bulkhead 36") disposed at, near, and/or adjacent to the front end 12 of the trailer 10. In embodiments, the trailer 10 may have a tarp deploy and/or roll-up system 24 (hereinafter "tarp system 24") disposed on the deck 16 between the front end 12, the rear end 14, and/or the rails 20. As a result, the tarp system 24 may be disposed or positioned between the bulkhead 36 and the rear end 14 of the trailer.

Figure 3:
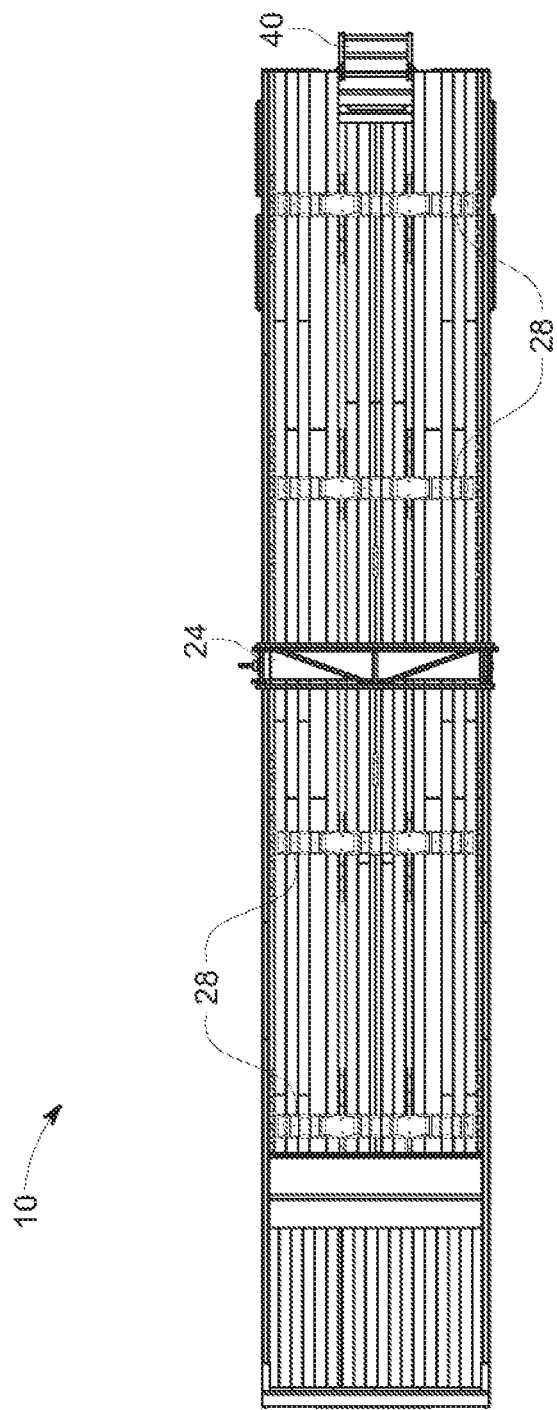
FIG. 3 is a top plan view of a flatbed trailer in accordance with embodiments disclosed herein.

In FIG. 3, the trailer 10 may have a plurality of movable load placement devices 28 (hereinafter "devices 28") disposed on the deck 16 of the trailer 10. In embodiments, the tarp system 24 may be disposed or positioned between at least two of the devices 28. As a result, one or more of the devices 28 may be disposed or positioned between the front end 12 or the bulkhead 36 and the tarp system 24 and/or between rear end 14 or the stairs 40 and the tarp system 24.

Figure 4:
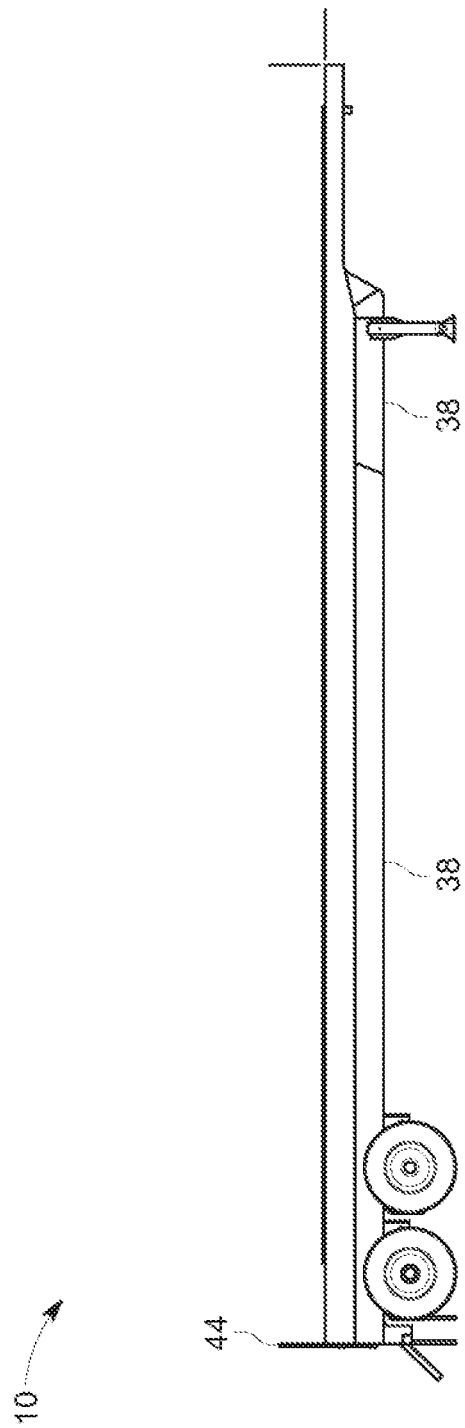
FIG. 4 is a side plan view of a flatbed trailer in accordance with embodiments disclosed herein.

In FIG. 4, the trailer 10 may have one or more load bearing beams 38 (hereinafter "beams 38") which may comprise a welded box beam construction. In embodiments, the beams 38 may comprise at least one of I-beams, welded I-beams, and a combination thereof. In embodiments, the beams may be disposed or positioned between the front end 12 and the rear end 14 of the trailer 10. The trailer 10 may also comprise one or more grab rails 44 (hereinafter "grab rails 44") for accessing the deck 16 of the trailer 10. In embodiment, the grab rails 44 may disposed or positioned at, near, and/or adjacent to the rear end 14 of the trailer 10.

Figure 5:
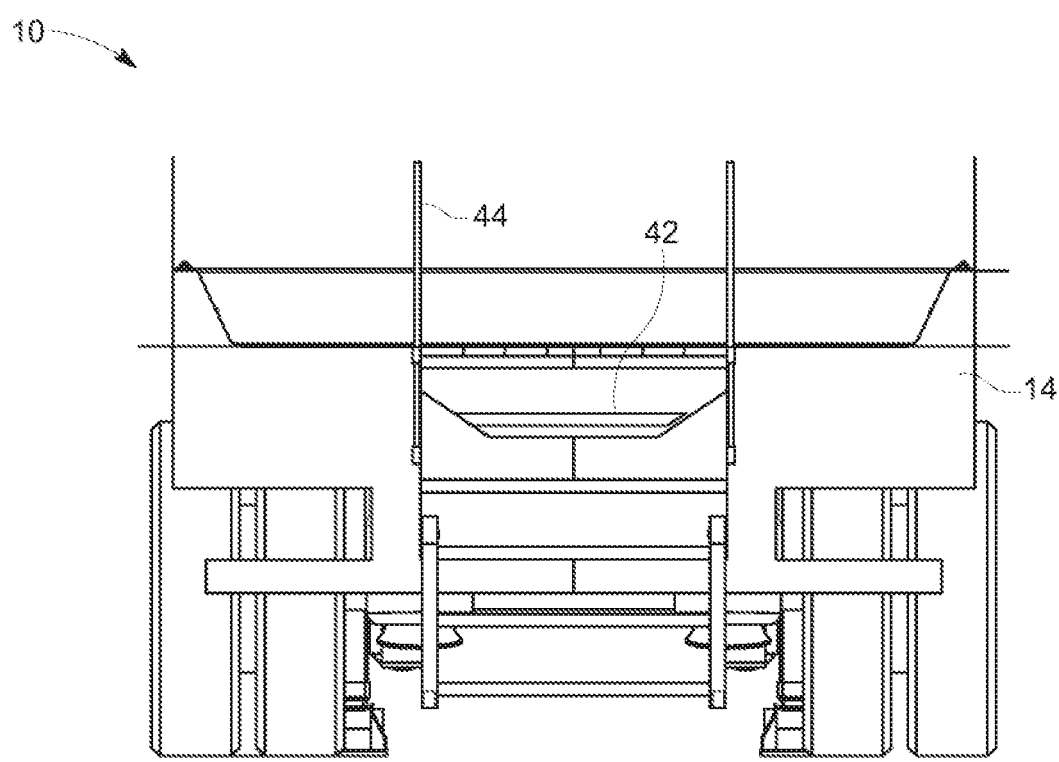
FIG. 5 is a rear plan view of a flatbed trailer in accordance with embodiments disclosed herein.

FIG. 5 is a rear view of the trailer 10 having the grab rails 44 and/or the stairs 40 disposed or positioned at, near, and/or adjacent to the rear end 14 of the trailer 10. In embodiments, the stairs 40 may comprise one or more stair treads 42 for accessing the deck 16 of the trailer 10.

Figure 6:
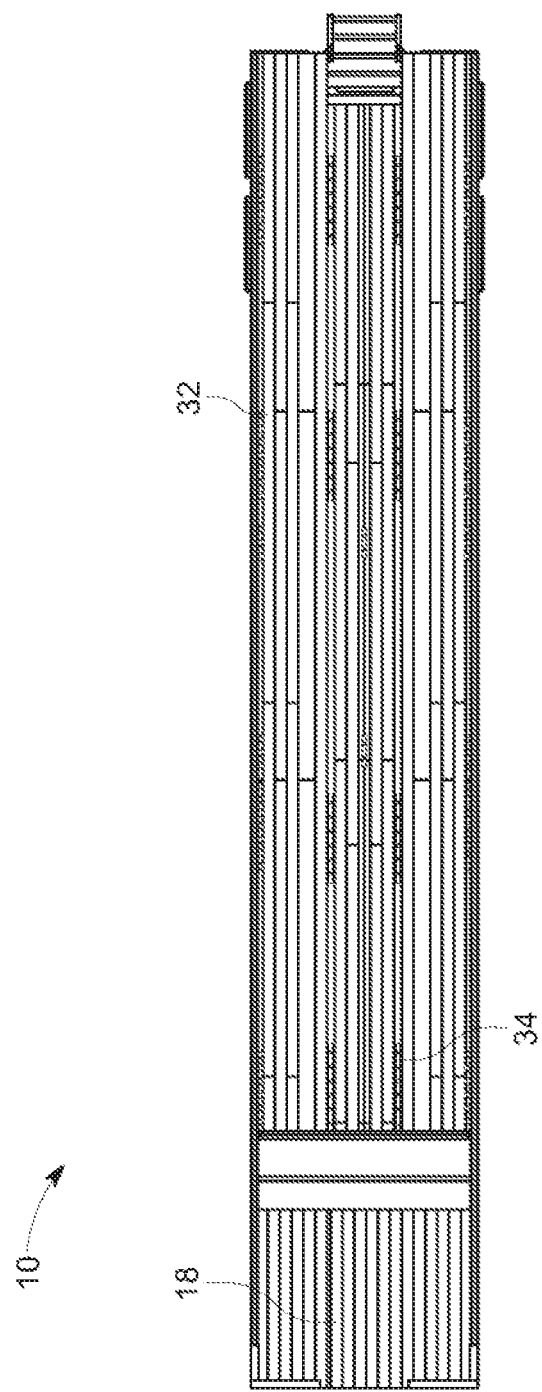
FIG. 6 is a top plan view of a flatbed trailer in accordance with embodiments disclosed herein.

In FIG. 6, the trailer 10 may comprise the decking 18 adjacent to the front end 12, a plurality of tie downs and/or fasteners 32 (hereinafter "fasteners 32"), and/or a plurality of pin and/or fastener locations 34 (hereinafter "fastener locations 34"). In embodiments, the fasteners 32 may be disposed or positioned at, near, and/or adjacent to the rails 20 and/or between the front end 12 and the rear end 14 of the trailer 10 for securing, connecting, fastening, or attached a load (not shown in the drawings) to the deck 16 and/or the trailer 10. In embodiments, the fastener locations 34 may be utilized or engaged for securing, connecting, securing, and attaching the devices 28 to the deck 16 and/or the trailer 10.

Figure 7:
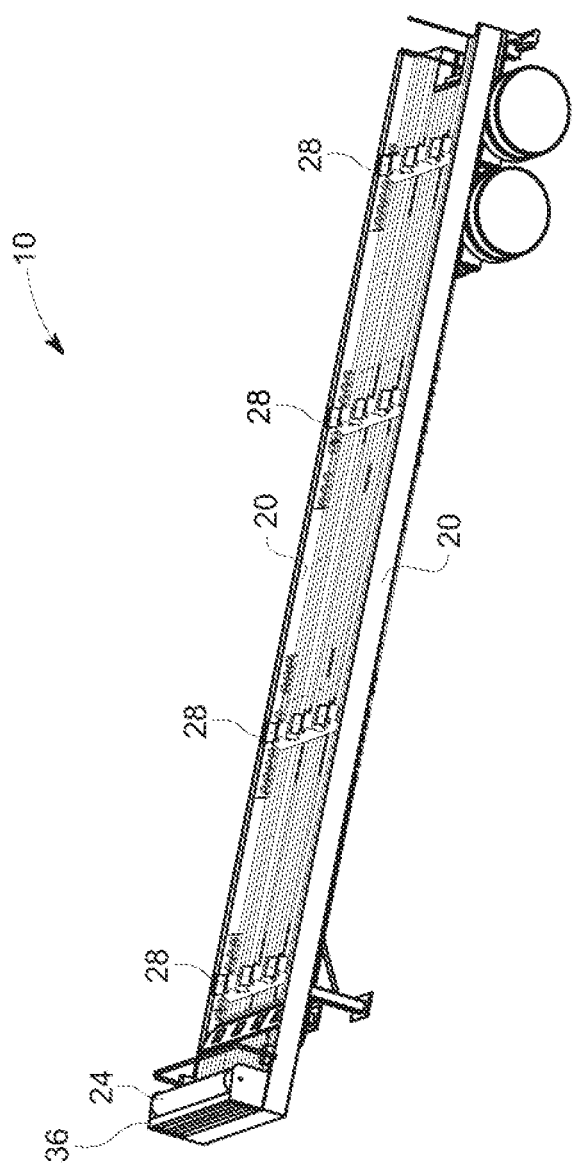
FIG. 7 is a side perspective view of a flatbed trailer in accordance with embodiments disclosed herein.

In FIG. 7, the trailer 10 may exhibit or have a lowered center of gravity facilitated by the deck 16 being disposed or positioned at the bottom edge 22 of the rails 20. In embodiments, the tarp system 24 may be disposed or positioned at, near, and/or adjacent to the bulkhead 36 and/or the front end 12 of the trailer 10. As a result, the tarp system 24 may be disposed or positioned between the bulkhead 36 or the front end 12 and the devices 28 or the rear end 14 of the trailer 10.

Figure 8:
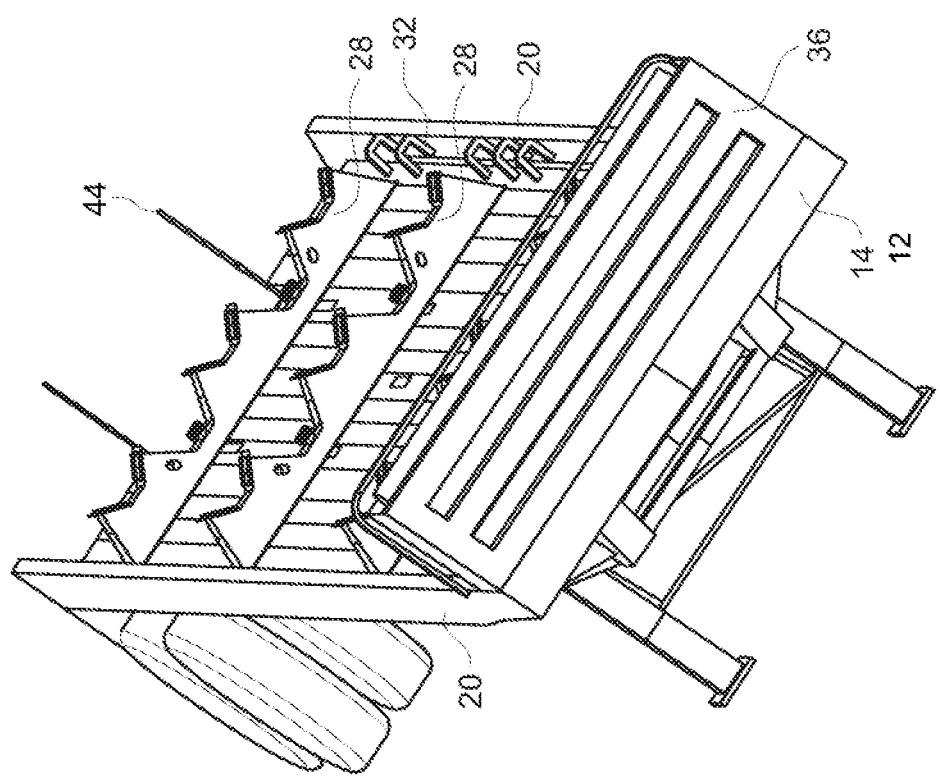
FIG. 8 is a front perspective view of a flatbed trailer in accordance with embodiments disclosed herein.

As shown in FIG. 8, the trailer 10, having a lowered center of gravity, may comprise the bulkhead 36 and the tarp system 24 adjacent to the front end 12 of the trailer. In embodiments, the fasteners 32 may be adjacent to the rails 22 and/or the grab rails 44 may be adjacent to the rear end 14 of the trailer 10. Additionally, the devices 28 may be secured, fastened, connected, and/or attached to the deck 16 or the trailer 10 via the fastener locations 34 such that the devices are disposed or positioned between the tarp system 24 or the bulkhead 36 and the grab rails 44, the stairs 40, and/or the rear end 14 of the trailer 10. In embodiments, one or more pins may extend through a portion of the devices 28 and into the fastener locations 34 of the deck 16 such that the one or more pins and the fastener locations 34 secure, fasten, connect, and/or attach the devices 28 to the deck 16 of the trailer 10.

Figure 9G:
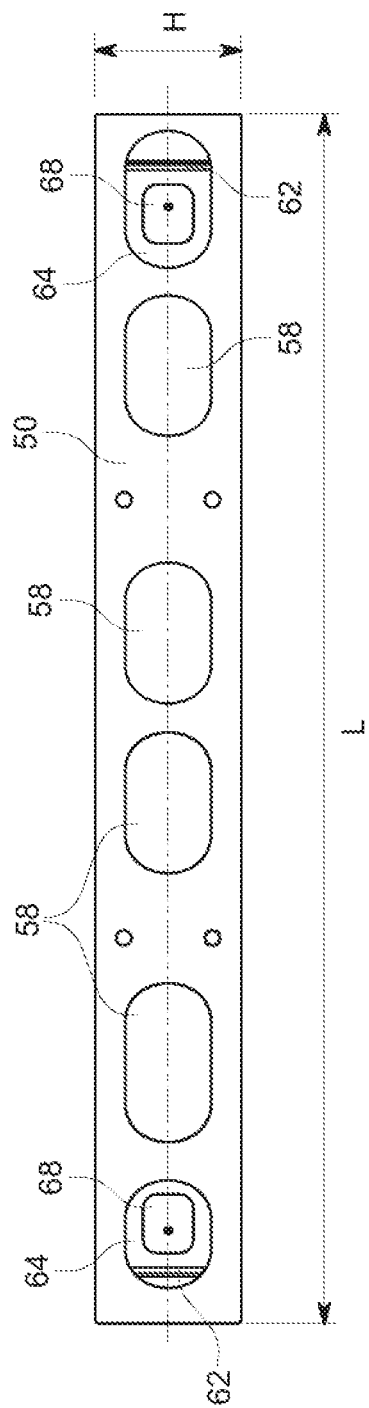
FIG. 9G is a bottom plan view of a movable load placement device in accordance with embodiments disclosed herein.
Figure 9I:
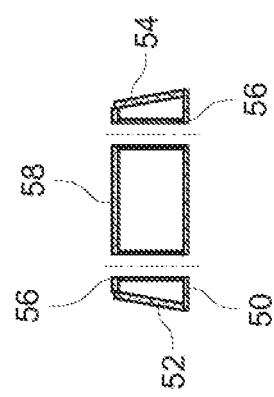
FIG. 9I is a cross-sectional view along line B-B of the movable load placement device illustrated in FIG. 9D in accordance with embodiments disclosed herein.
Figure 9H:
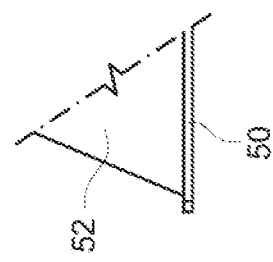
FIG. 9H is a plan sectional view of a movable load placement device in accordance with embodiments disclosed herein.
Figure 9J:
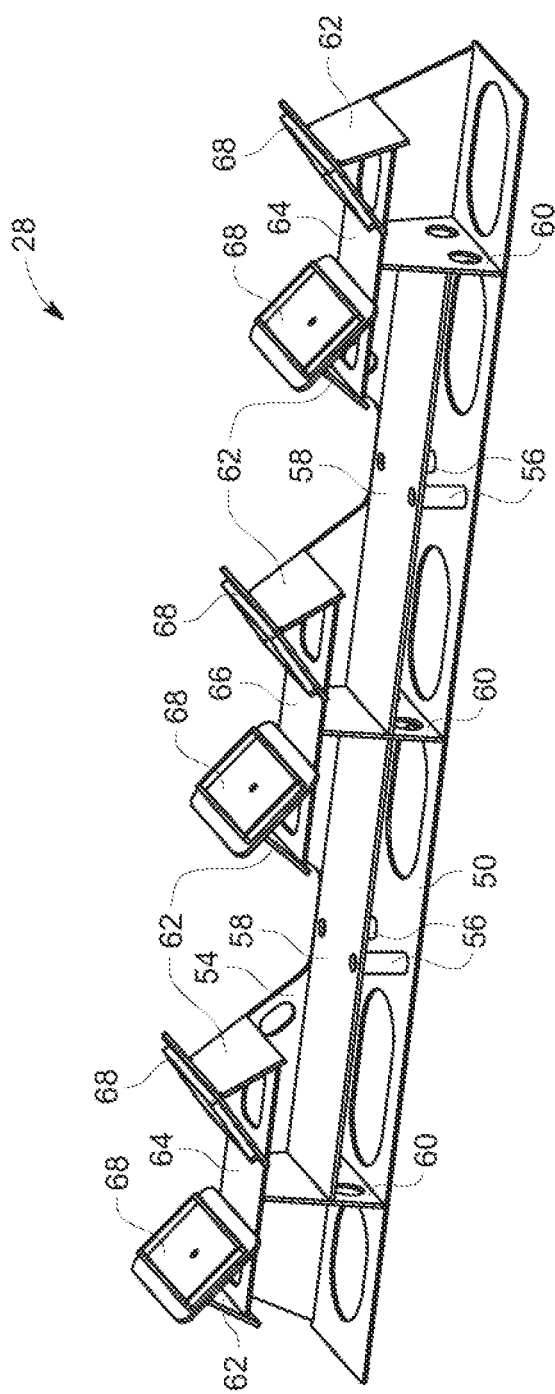
FIG. 9J is a side perspective view of a movable load placement device in accordance with embodiments disclosed herein.
Figure 9O:
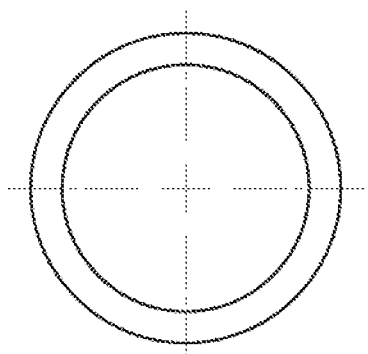
FIG. 9O is a side plan view of a COMPONENT2 of a movable load placement device in accordance with embodiments disclosed herein.
Figure 9P:
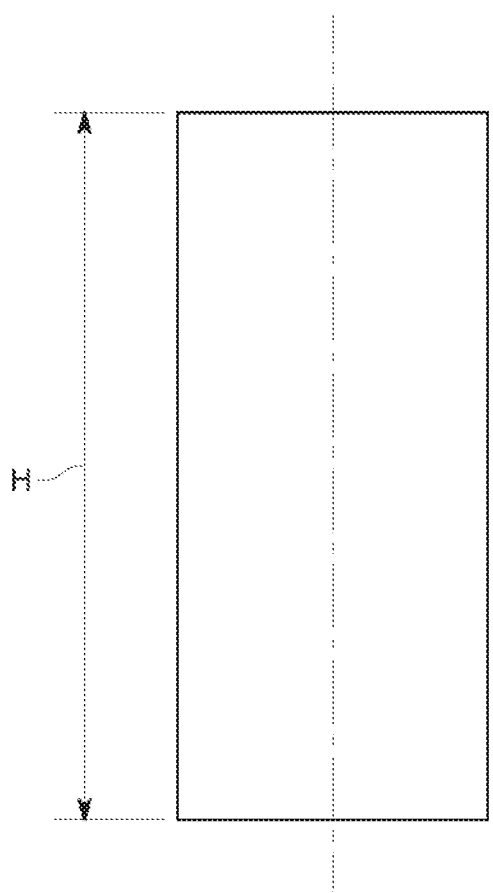
FIG. 9P is a top plan view of a COMPONENT2 of a movable load placement device in accordance with embodiments disclosed herein.
Figures 9Q, 9R:
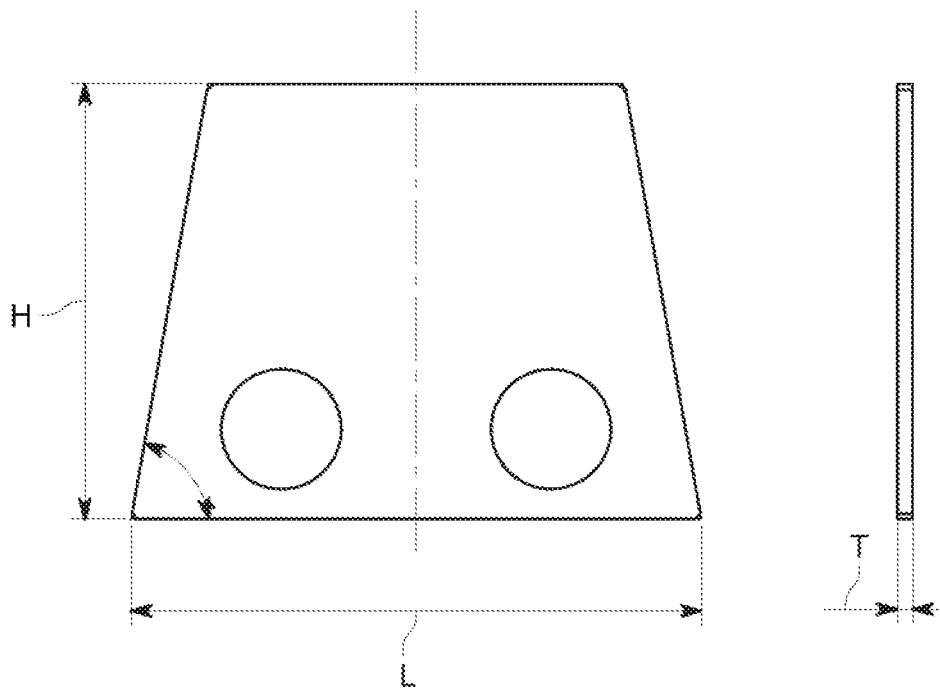
FIG. 9Q is a top plan view of a COMPONENT3 of a movable load placement device in accordance with embodiments disclosed herein.
FIG. 9R is a side plan view of a COMPONENT3 of a movable load placement device in accordance with embodiments disclosed herein.
Figures 9S, 9T:
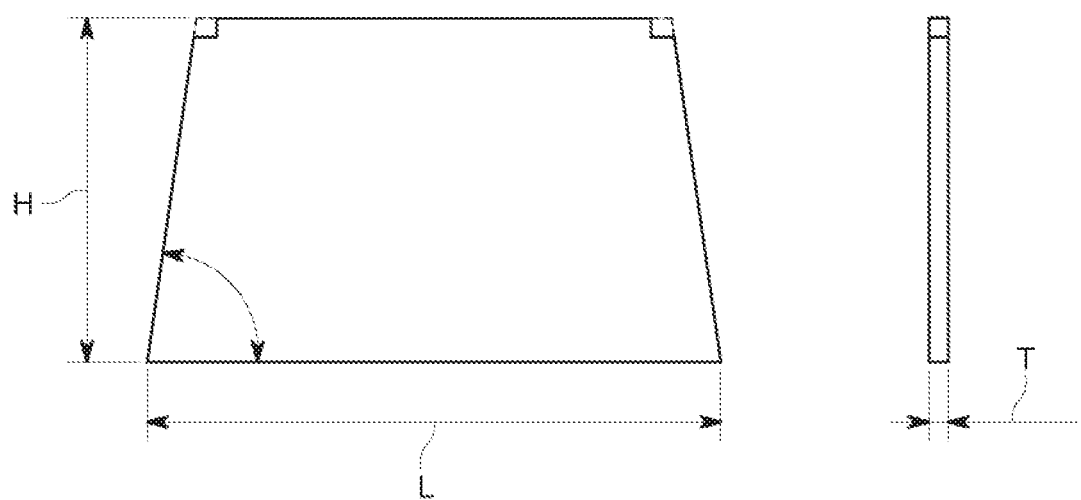
FIG. 9S is a top plan view of a COMPONENT4 of a movable load placement device in accordance with embodiments disclosed herein.
FIG. 9T is a side plan view of a COMPONENT4 of a movable load placement device in accordance with embodiments disclosed herein.
Figure 9U:
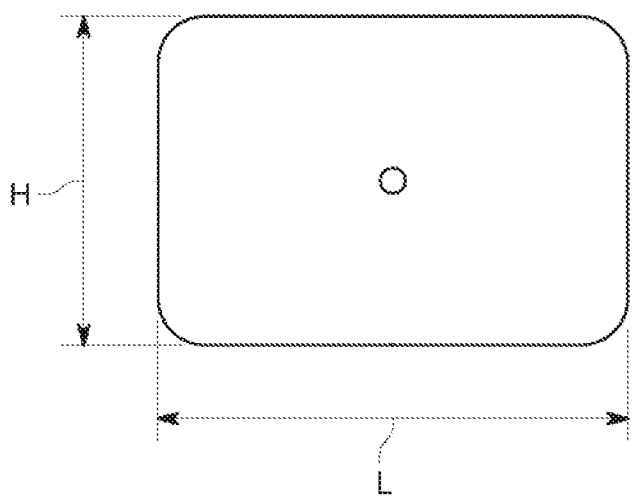
FIG. 9U is a top plan view of a COMPONENT5 of a movable load placement device in accordance with embodiments disclosed herein.
Figure 9V:
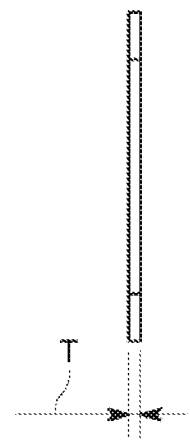
FIG. 9V is a side plan view of a COMPONENT5 of a movable load placement device in accordance with embodiments disclosed herein.
Figure 9W:
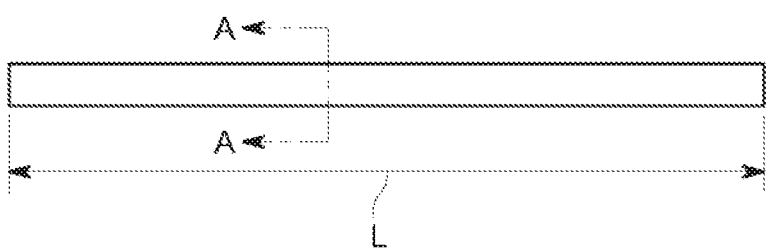
FIG. 9W is a top plan view of a COMPONENT6 of a movable load placement device in accordance with embodiments disclosed herein.
Figure 9X:
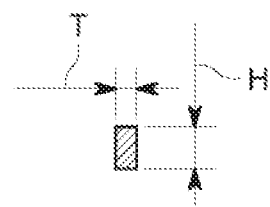
FIG. 9X is a cross-sectional view of the COMPONENT6 along line A-A as illustrated in FIG. 9W in accordance with embodiments disclosed herein.
Figure 9Y:
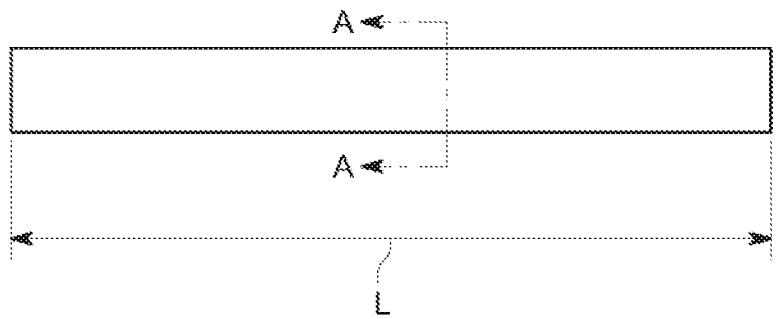
FIG. 9Y is a top plan view of a COMPONENT7 of a movable load placement device in accordance with embodiments disclosed herein.
Figure 9Z:
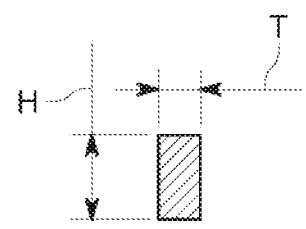
FIG. 9Z is a cross-sectional view of the COMPONENT7 along line A-A as illustrated in FIG. 9Y in accordance with embodiments disclosed herein.
Figure 9A:
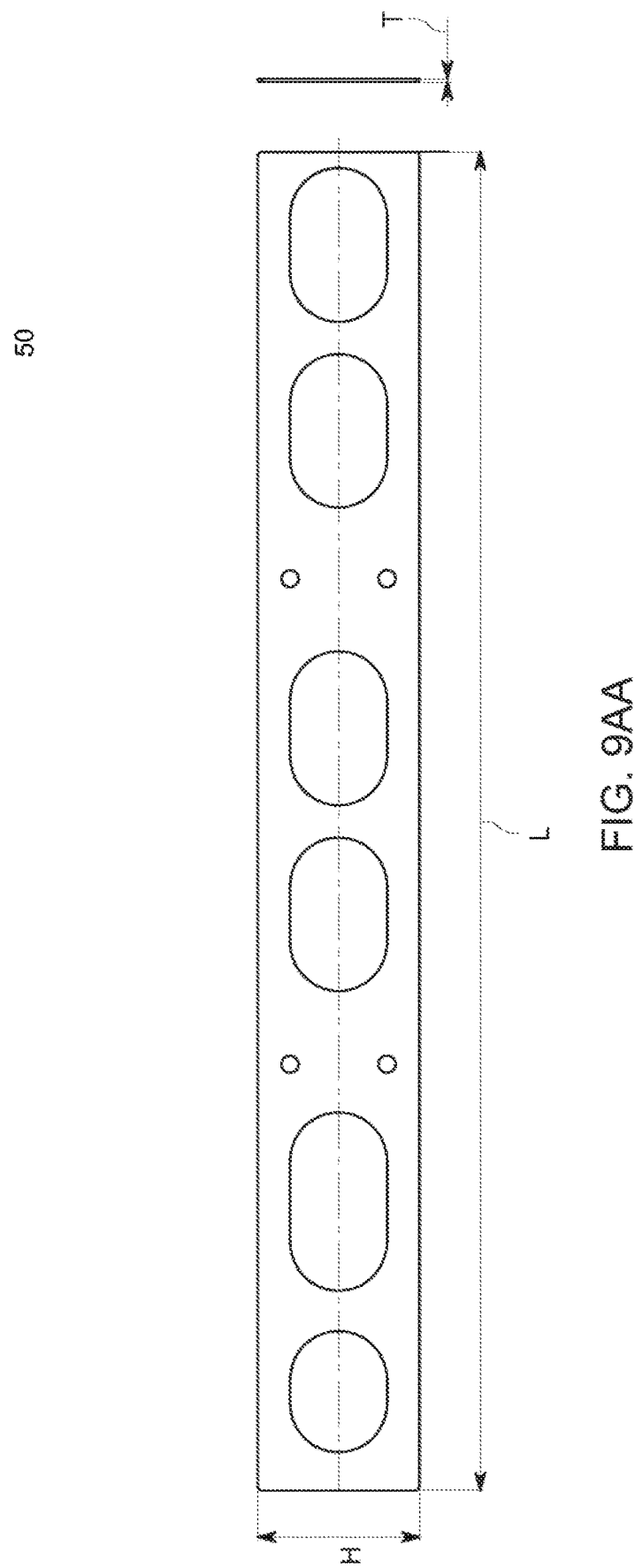
FIG. 9A is a top plan view of a movable load placement device in accordance with embodiments disclosed herein.
Figure 9A:
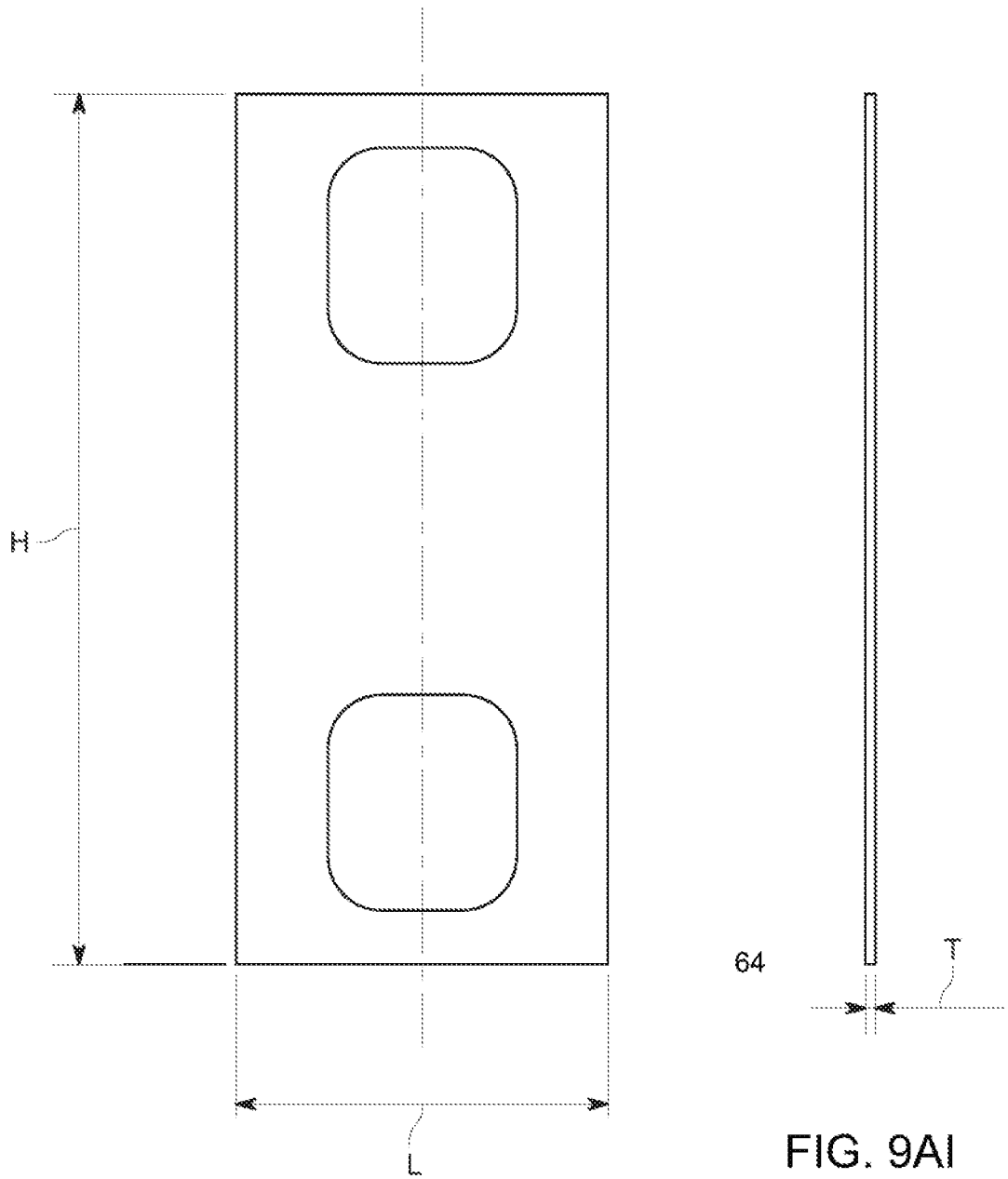
Figure 9A:
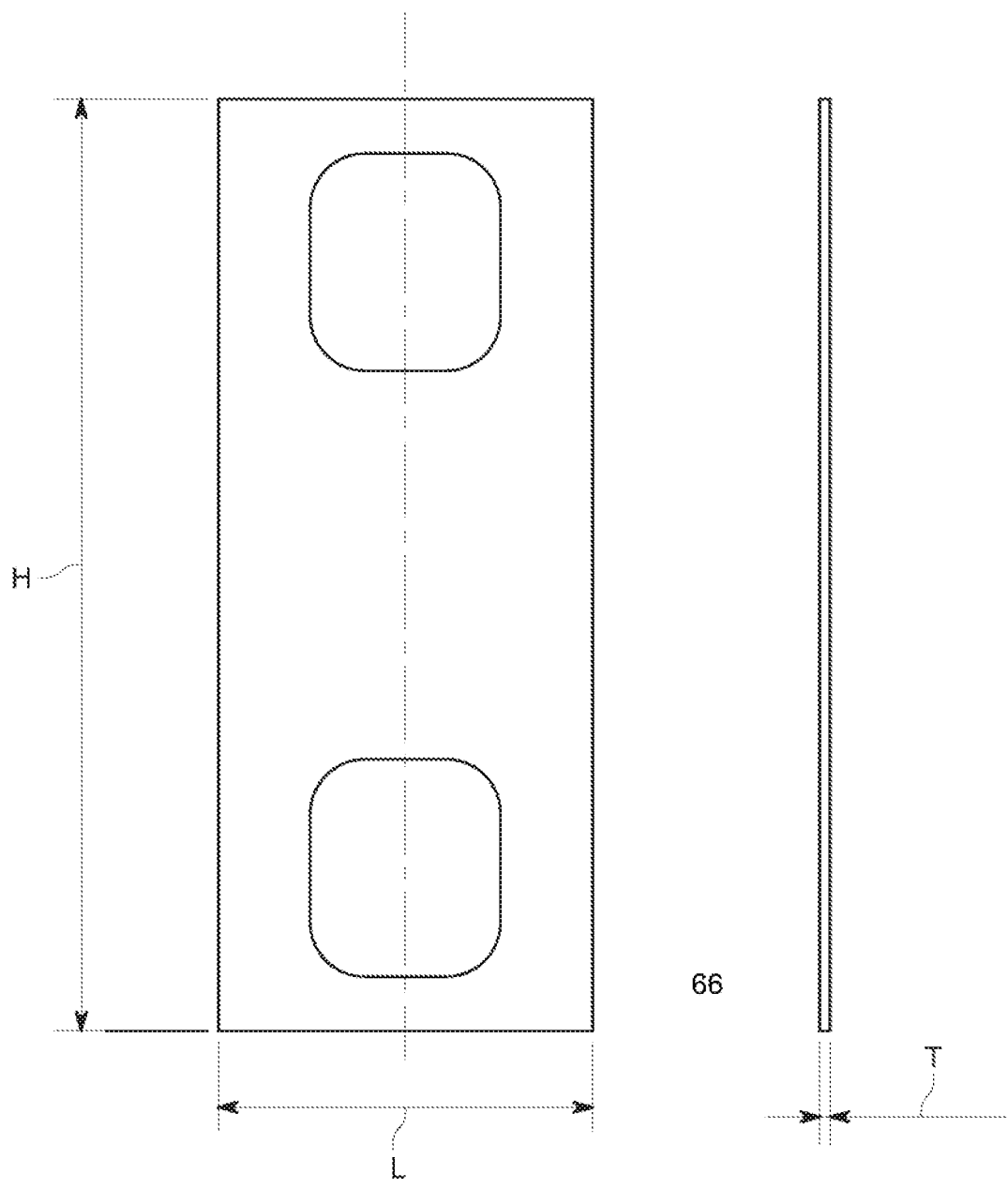

FIGS. 9A-9AK illustrate views of the devices 28 and a plurality of components of the devices 28. In embodiments, the devices 28 may be, may include, and/or may incorporate a plurality of wedges, blocks, and/or chocks therein. As shown in FIGS. 9A-9AK, the devices 28 may have or comprise one or more of the following components: one or more bottom plates 50 (hereinafter "bottom plates 50"); one or more first main side plates 52 (hereinafter "first main side plates 52"); one or more second main side plates 54 (hereinafter "second main side plates 54"); one or more plate tubes 56 (hereinafter "plate tubes 56"); one or more inner horizontal plates 58 (hereinafter "inner horizontal plates 58"); one or more inner vertical plates 60 (hereinafter "inner vertical plates 60"); one or more side small plates 62 (hereinafter "side small plates 62"); one or more first inner small plates 64 (hereinafter "first inner small plates 64"); one or more second inner small plates 66 (hereinafter "second inner small plates 66"); one or more roll blocks 68 (hereinafter "roll blocks 68"); one or more roll base plates 70 (hereinafter "roll base plates 70"), one or more first roll block retainers 72 (hereinafter "first roll block retainers 72"); one or more second roll block retainers 74 (hereinafter "second roll block retainers 74"), and/or one or more combinations thereof. One or more of the above-mentioned components of the devices 28 may be connected, attached, fastened, secured, pinned, molded, welded, bolted, formed together to each other. In an embodiment, one or more of the above-mentioned components of the devices 28 may be formed by additive manufacturing, welding, extruding, and/ or forging techniques.

FIGS. 9A-9J illustrate one device 28 that may be secured, fastened, connected, and/or attached to the deck 16 and/or the trailer 10 via the bottom plates 50. The roll blocks 68 may be secured, fastened, connected, and/or attached to one another via at least one of the bottom plates 50, the first main side plates 52, the second main side plates 54, the plate tubes 56, the inner horizontal plates 58, the inner vertical plates 60, the side small plates 62, the first inner small plates 64, the second inner small plates 66, and/or at least one combination thereof. As a result, at least one of the bottom plates 50, the first main side plates 52, the second main side plates 54, the plate tubes 56, the inner horizontal plates 58, the inner vertical plates 60, the side small plates 62, the first inner small plates 64, and/or the second inner small plates 66 may be disposed or positioned between the roll blocks 68 and the deck 16 and/or the trailer 10. In embodiments, at least one of the first main side plates 52, the second main side plates 54, the plate tubes 56, the inner horizontal plates 58, the inner vertical plates 60, the side small plates 62, the first inner small plates 64, the second inner small plates 66, and/or the roll blocks 68 may be secured, fastened, connected, and/or attached to the deck 16 and/or the trailer 10 via the bottom plates 50.

As shown in FIGS. 9A, 9C, 9G, and 9J, the bottom plates 50 and/or the inner horizontal plates 58 may have one or more orifices, holes, and/or openings formed therethrough for securing, fastening, connecting, and/or attaching the device 28 to the deck 16 and/or the trailer 10. The plate tubes 56 and/or the one or more orifices, holes, and/or openings may be sized, shaped, configured, and/or adapted to receive at least one fastener for securing, fastening, connecting, and/or attaching the device 28 to the deck 16 and/or the trailer 10. In embodiments, the at least one fastener may be selected from at least one pin, at least one bolt, at least one screw, at least one nail, at least one rivet, at least one adhesive or epoxy, at least one flange, at least one rod, at least one insert, and a combination thereof.

The roll blocks 68 may be grouped, separated, and/or partitioned into sets of pairs that provide a space, an area, and/or a void therebetween which is shaped, sized, configured, and/or adapted to receive, hold, and maintain a load between each set of pairs of roll blocks 68. In embodiments, the space, the area, and/or the void formed or disposed between each set of pairs of the roll blocks 68 may be O-shaped, V-shaped, square-shaped, rectangle-shaped, oval-shaped, or a combination thereof. The fasteners 32 and/or the roll blocks 68 may contact, engage, and/or hold loads such that the loads are secured, fastened, connected, and/or attached to the deck 16 and/or the trailer 10 via the devices 28, the fasteners 32, and/or the roll blocks 68. As a result, the devices 28 and/or the fasteners 32 secure, fasten, connect, and/or attach the loads to the deck 16 and/or the trailer 10.

FIGS. 9K and 9L illustrate one roll block 68 of one device 28 that may be secured, fastened, connected, and/or attached to deck 16 and/or the trailer 10 via the bottom plates 50. In embodiments, the roll blocks 68 may have or comprise at least one of the roll base plates 70, the first roll block retainers 72, the second roll block retainers 74, and/or at least one combination thereof. The first roll block retainers 72 and/or the second roll block retainers 74 (collectively referred to hereinafter as "first and second roll block retainers 72, 74") may be disposed or positioned on a first side of the roll base plates 70 such that the first and second roll block retainers 72, 74 may be disposed entirely within a perimeter of the first side of the roll base plates 70 as shown in FIG. 9K. The first and second roll block retainers may be sized, shaped, configured and/or adapted to receive, hold, and/or maintain the loads within the roll blocks 68. In an embodiments, the first and second roll block retainers 72, 74 may form a shaped of a square, rectangle, circle, oval, or a combination thereof.

As shown in FIG. 9L, a thickness of the roll base plates may be less than a thickness of the first and second roll block retainers 72, 74.

FIGS. 9M and 9N illustrate the COMPONENT1 of the devices 28, wherein a length of the COMPONENT1 is greater than a height of the COMPONENT1 and the height of the COMPONENT1 is greater than a thickness of the COMPONENT1.

FIGS. 9O and 9P illustrate the COMPONENT2 of the devices 28, wherein a length of the COMPONENT2 is greater than a diameter of the COMPONENT2 and the diameter of the COMPONENT2 is greater than a wall thickness of the COMPONENT2.

FIGS. 9Q and 9R illustrate the COMPONENT3 of the devices 28, wherein a height of the COMPONENT3 is greater than a length of the COMPONENT3 and the length of the COMPONENT3 is greater than a thickness of the COMPONENT3. In embodiments, the length of the COMPONENT3 changes or varies along the height of the COMPONENT3 and/or one or more orifices, holes, and/or openings may be formed through the thickness of the COMPONENT3 along the height and/or the length of the COMPONENT3. Surfaces of the height and the length of the COMPONENT3 may form an angle therebetween and the angle may be less than about 90 degrees, more than about 60 degrees, or about 80 degrees.

FIGS. 9S and 9T illustrate the COMPONENT4 of the devices 28, wherein a length of the COMPONENT4 is greater than a height of the COMPONENT4 and the height of the COMPONENT4 is greater than a thickness of the COMPONENT4. In embodiments, one or more corners of a perimeter of the COMPONENT4 may have or comprise a cut-away area or a groove formed therein. Surfaces of the height and the length of the COMPONENT4 may form an angle therebetween and the angle may be less than about 90 degrees, more than about 60 degrees, or about 82 degrees.

FIGS. 9U and 9V illustrate the COMPONENT5 of the devices 28, wherein a length of the COMPONENT5 is greater than a height of the COMPONENT5 and the height of the COMPONENT5 is greater than a thickness of the COMPONENT5. In embodiments, one or more corners of a perimeter of the COMPONENT5 may be angle, curved, or convexed. In embodiments, at least one orifice, hole, and/or opening may be formed through the thickness of the COMPONENT5 along the length and the height of the COMPONENT5.

FIGS. 9W and 9X illustrate the COMPONENT6 of the devices 28, wherein a length of the COMPONENT6 is greater than a height of the COMPONENT6 and the height of the COMPONENT6 is greater than a thickness of the COMPONENT6.

FIGS. 9Y and 9Z illustrate the COMPONENT7 of the devices 28, wherein a length of the COMPONENT7 is greater than a height of the COMPONENT7 and the height of the COMPONENT7 is greater than a thickness of the COMPONENT7.

FIG. 9AA illustrates one of the bottom plate 50 of the devices 28, wherein a length of the bottom plate 50 is greater than a height of the bottom plate 50 and the height of the bottom plate 50 is greater than a thickness of the bottom plate 50. In embodiments, at least one first opening and at least one second opening may be formed through the thickness of the bottom plate 50 and a circumference of the at least one first opening may be greater than, less than, or about equal to a circumference of the at least one second opening of the bottom plate 50.

FIGS. 9AD and 9AE illustrate the first main side plate 52 of the devices 28, wherein a length of the first main side plate 52 is greater than a height of the first main side plate 52 and the height of the first main side plate 52 is greater than a thickness of the first main side plate 52. In embodiments, the height of the first main side plate 52 changes or varies along the length of the first main side plate 52. Surfaces of the height and the length of the first main side plate 52 may form at least one first angle and at least one second angle therebetween and the at least one first angle and/or the at least one second angle may be less than about 90 degrees, more than about 45 degrees, about 67 degrees, or about 54 degrees.

FIGS. 9AF and 9AG illustrate the second main side plate 54 of the device 28, wherein a length of the second main side plate 54 is greater than a height of the second main side plate 54 and the height of the second main side plate 54 is greater than a thickness of the second main side plate 54. In embodiments, the height of the second main side plate 54 changes or varies along the length of the second main side plate 54. Surfaces of the height and the length of the second main side plate 54 may form at least one first angle and at least one second angle therebetween and the at least one first angle and/or the at least one second angle may be less than about 90 degrees, more than about 45 degrees, about 67 degrees, or about 54 degrees.

FIGS. 9AH and 9AI illustrate the COMPONENT8 of the devices 28, wherein a length of the COMPONENT8 is greater than a height of the COMPONENT8 and the height of the COMPONENT8 is greater than a thickness of the COMPONENT8. In embodiments, at least one first opening and at least one second opening may be formed through the thickness of the COMPONENT8 and a circumference of the at least one first opening may be greater than, less than, or about equal to a circumference of the at least one second opening of the COMPONENT8.

FIGS. 9AJ and 9AK illustrate the COMPONENT9 of the devices 28, wherein a length of the COMPONENT9 is greater than a height of the COMPONENT9 and the height of the COMPONENT9 is greater than a thickness of the COMPONENT9. In embodiments, at least one first opening and at least one second opening may be formed through the thickness of the COMPONENT9 and a circumference of the at least one first opening may be greater than, less than, or about equal to a circumference of the at least one second opening of the COMPONENT9.

Figure 10A:
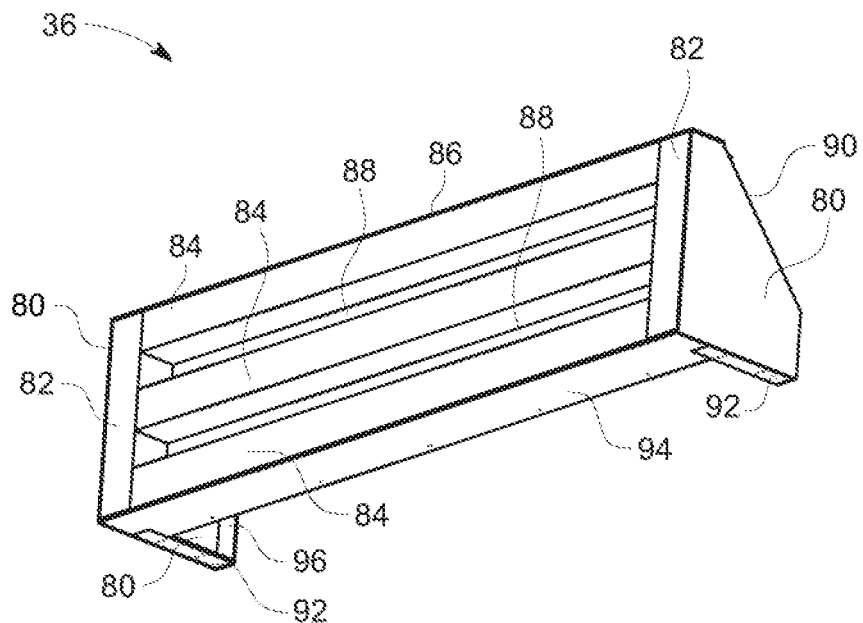
FIG. 10A is a front perspective view of a collapsible and/or crushable bulkhead in accordance with embodiments disclosed herein.
Figure 10B:
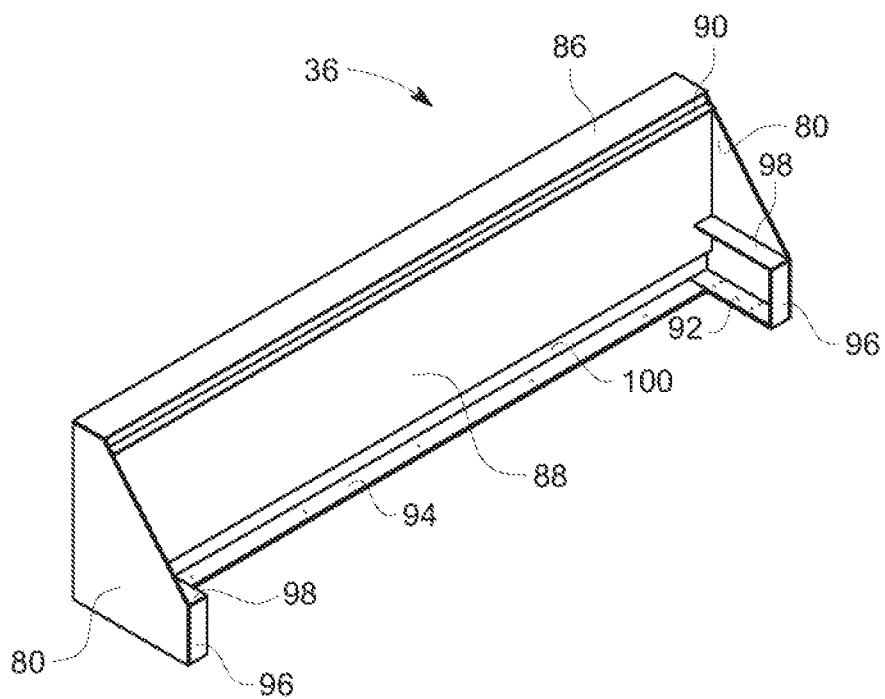
FIG. 10B is a rear perspective view of a collapsible and/or crushable bulkhead in accordance with embodiments disclosed herein.
Figures 10C, 10D:
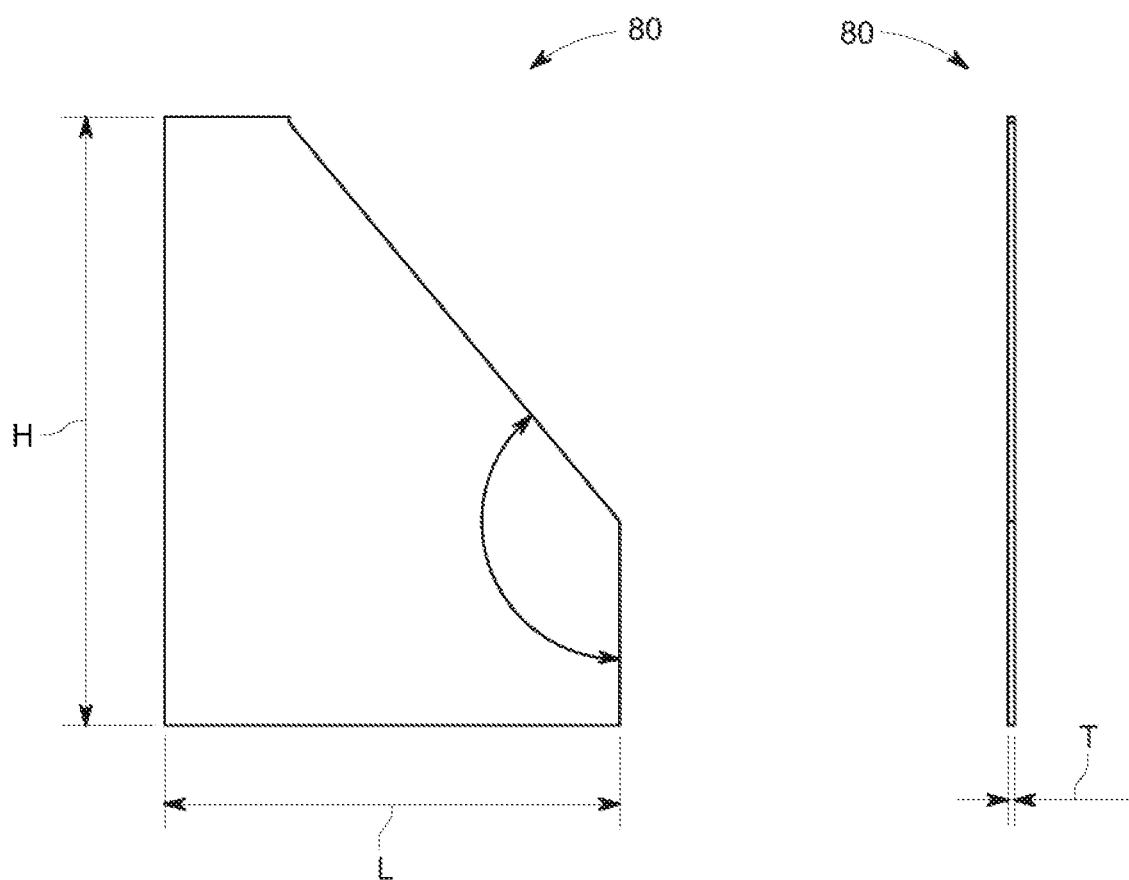
FIG. 10C is a front plan view of a side plate of a collapsible and/or crushable bulkhead in accordance with embodiments disclosed herein.
FIG. 10D is a side plan view of a side plate of a collapsible and/or crushable bulkhead in accordance with embodiments disclosed herein.
Figure 10I:
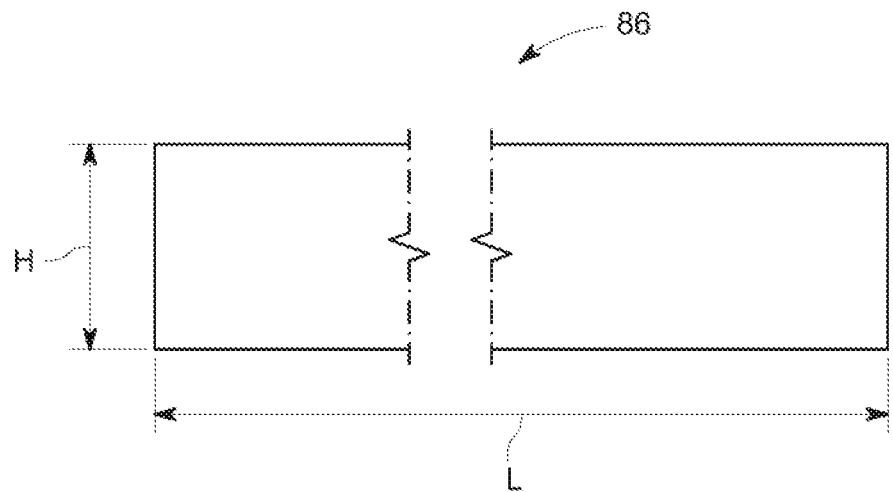
FIG. 10I is a top plan view of a top cross plate of a collapsible and/or crushable bulkhead in accordance with embodiments disclosed herein.
Figure 10J:
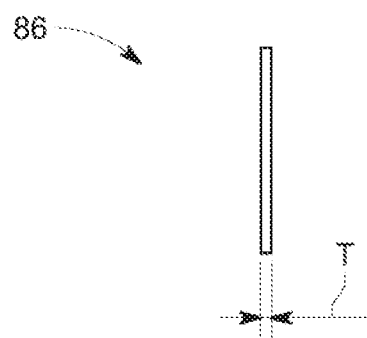
FIG. 10J is a side plan view of a top cross plate of a collapsible and/or crushable bulkhead in accordance with embodiments disclosed herein.
Figure 10M:
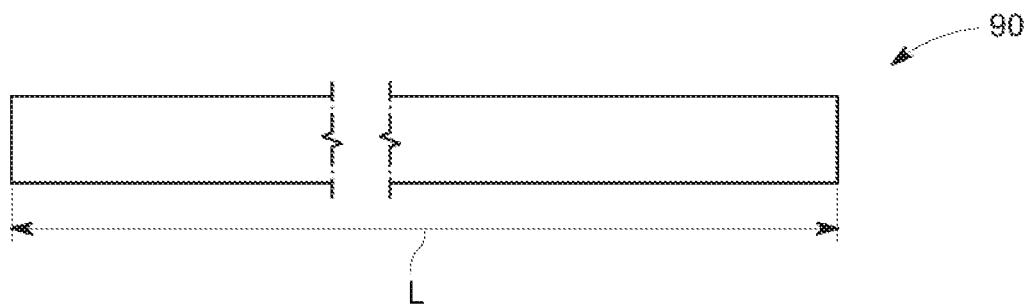
FIG. 10M is a top plan view of an angle plate of a collapsible and/or crushable bulkhead in accordance with embodiments disclosed herein.
Figure 10N:
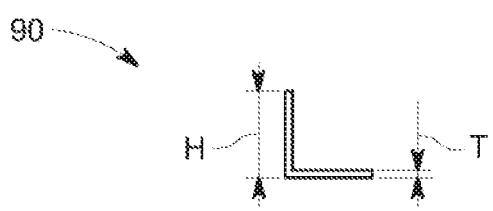
FIG. 10N is a side plan view of an angle plate of a collapsible and/or crushable bulkhead in accordance with embodiments disclosed herein.
Figure 10O:
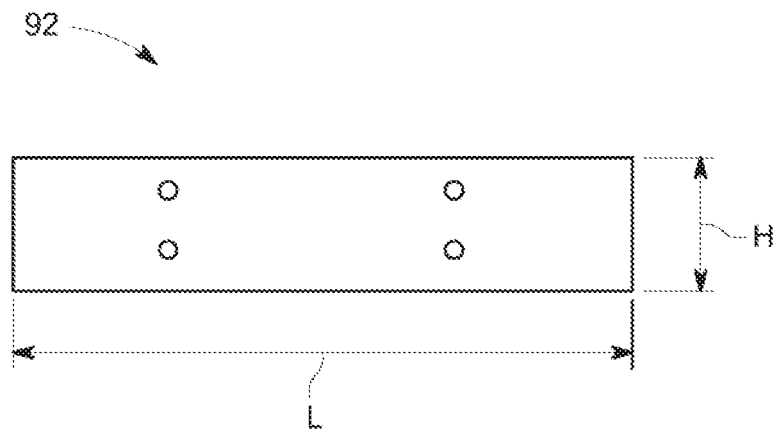
FIG. 10O is a top plan view of a bolt plate of a collapsible and/or crushable bulkhead in accordance with embodiments disclosed herein.
Figure 10P:
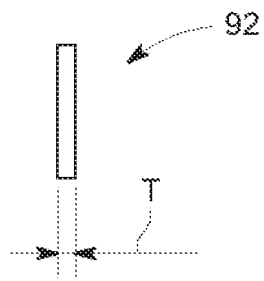
FIG. 10P is a side plan view of a bolt plate of a collapsible and/or crushable bulkhead in accordance with embodiments disclosed herein.
Figure 10Q:
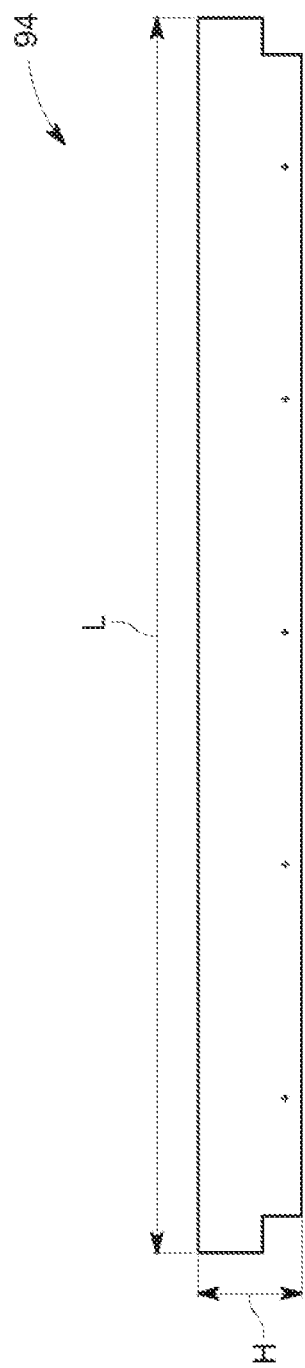
FIG. 10Q is a top plan view of a bottom cross plate of a collapsible and/or crushable bulkhead in accordance with embodiments disclosed herein.
Figure 10R:
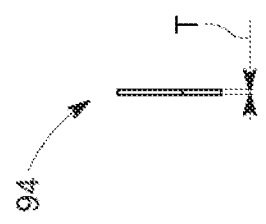
FIG. 10R is a side plan view of a bottom cross plate of a collapsible and/or crushable bulkhead in accordance with embodiments disclosed herein.
Figures 10S, 10T:
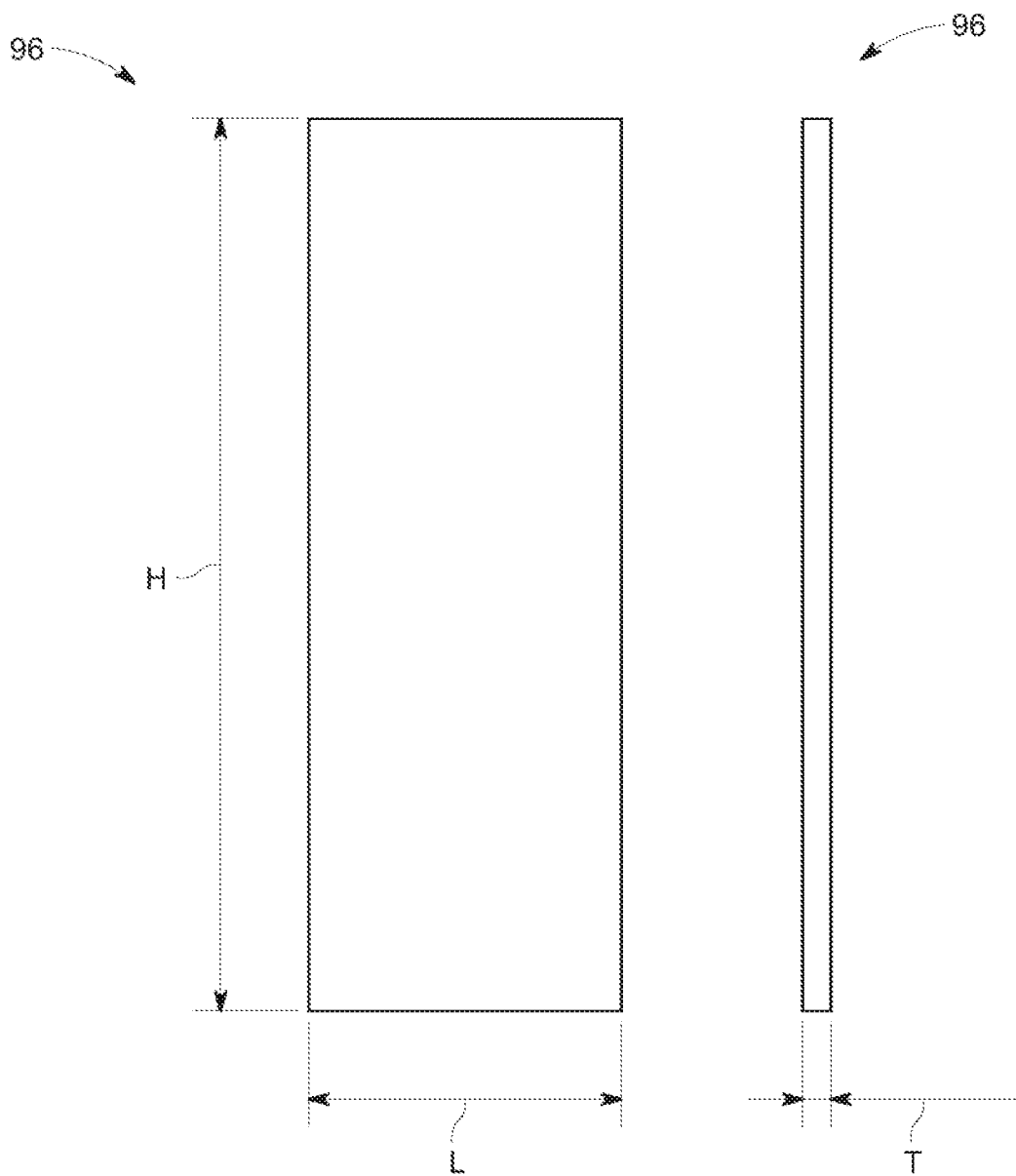
FIG. 10S is a top plan view of a back vertical plate of a collapsible and/or crushable bulkhead in accordance with embodiments disclosed herein.
FIG. 10T is a side plan view of a back vertical plate of a collapsible and/or crushable bulkhead in accordance with embodiments disclosed herein.
Figure 10U:
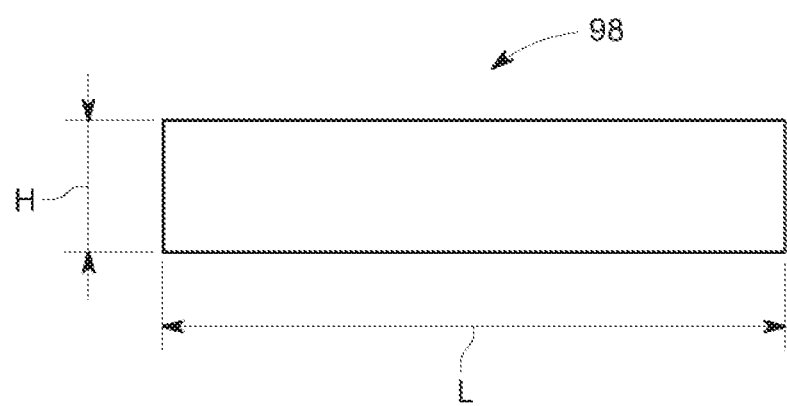
FIG. 10U is a top plan view of a back horizontal plate of a collapsible and/or crushable bulkhead in accordance with embodiments disclosed herein.
Figure 10V:
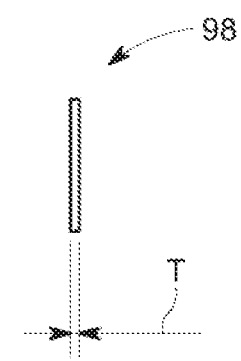
FIG. 10V is a side plan view of a back horizontal plate of a collapsible and/or crushable bulkhead in accordance with embodiments disclosed herein.
Figure 10W:
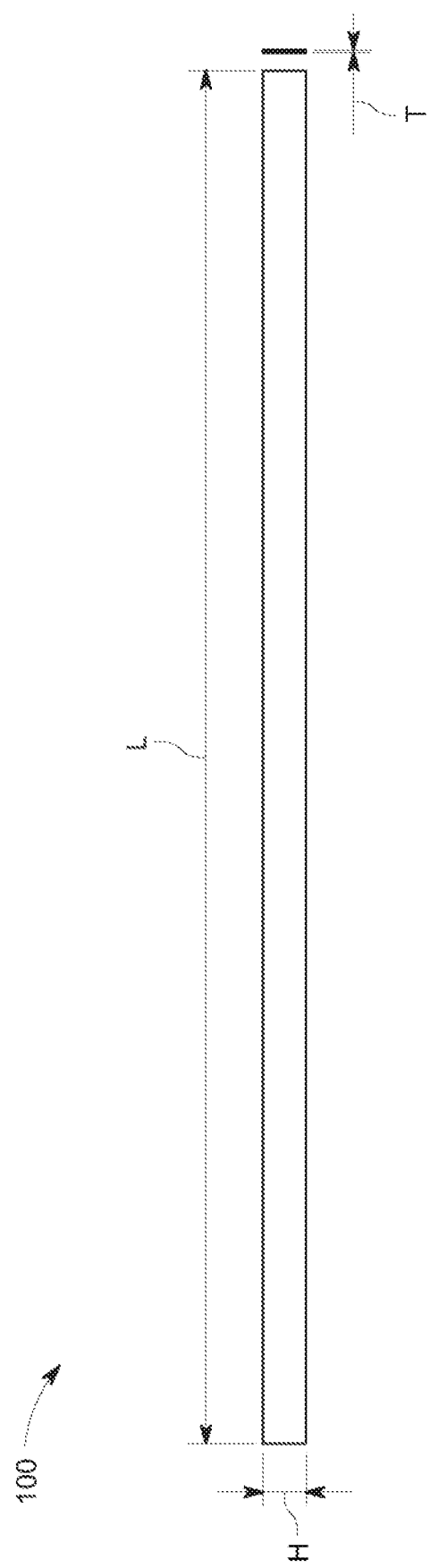
FIG. 10W is a top plan view of a back tube plate of a collapsible and/or crushable bulkhead in accordance with embodiments disclosed herein.

FIGS. 10A-10W illustrate views of the bulkhead 36 and a plurality of components of the bulkhead 36. In embodiments, the bulkhead 36 may have and/or comprise one or more of the following components: one or more side plates 80 (hereinafter "side plates 80"); one or more vertical tubes 82 (hereinafter "vertical tubes 82"); one or more cross tubes 84 (hereinafter "cross tubes 84"); one or more top cross plates 86 (hereinafter "top cross plates 86"); one or more back cross plates 88 (hereinafter "back cross plates 88"); one or more angle plates 90 (hereinafter "angle plates 90"); one or more bolt plates 92 (hereinafter "bolt plates 92"); one or more bottom cross plates 94 (hereinafter "bottom cross plates 94"); one or more back vertical plates 96 (hereinafter "back vertical plates 96"), one or more back horizontal plates 98 (hereinafter "back horizontal plates 98"), one or more back tube plates 100 (hereinafter "back tube plates 100"), and/or one or more combinations thereof. One or more of the above-mentioned components of the bulkhead 36 may be connected, attached, fastened, secured, pinned, molded, welded, bolted, formed together to each other. In an embodiment, one or more of the above-mentioned components of the bulkhead 36 may be formed by additive manufacturing, welding, extruding, and/or forging techniques.

FIGS. 10A and 10B illustrate the bulkhead 36 having or comprising at least one of the side plates 80 and the angle plates 90 secured, fastened, connected, and/or attached together to each other via at least one selected from the vertical tubes 82, the cross tubes 84, the top cross plates 86, the back cross plates 88, the bolt plates 92, the bottom cross plates 94, the back vertical plates 96, the back horizontal plates 98, the back tube plates 100, and at least one combination thereof. In embodiments, at least one of the vertical tubes 82, the cross tubes 84, the top cross plates 86, the back cross plates 88, the bolt plates 92, the bottom cross plates 94, the back vertical plates 96, the back horizontal plates 98, and/or the back tube plates 100 may be disposed or positioned between the side plates 80 and/or the angle plates 90.

In embodiments, the bolt plates 92 and/or the bottom cross plates 94 may secure, fasten, connect, and/or attached the bulkhead 36 to the deck 16, the decking 18, and/or the trailer 10. One or more orifices, holes, and/or opening may be formed therethrough the bolt plates 92 and/or the bottom cross plates 94 and/or may be sized, shaped, configured, and/or adapted to receive one or more fasteners for securing, fastening, connecting, and/or attaching the bulkhead 36 to the deck 16, the decking 18, and/or the trailer 10. In embodiments, the one or more fasteners may be selected from at least one pin, at least one bolt, at least one screw, at least one nail, at least one rivet, at least one adhesive or epoxy, at least one flange, at least one rod, at least one insert, and a combination thereof. As a result, one or more of the side plates 80, the vertical tubes 82, the cross tubes 84, the top cross plates 86, the back cross plates 88, the angle plates 90, the back vertical plates 96, the back horizontal plates 98, and/or the back tube plates 100 may be secured, fastened, connected, and/or attached to the deck 16, the decking 18, and/or the trail 10 via the bolt plates 92, the bottom cross plates 94, and/or the one or more fasteners.

In embodiments, at least one of the side plates 80, the vertical tubes 82, the cross tubes 84, the top cross plates 86, the back cross plates 88, the angle plates 90, the bolt plates 92, the bottom cross plates 94, the back vertical plates 96, the back horizontal plates 98, and/or the back tube plates 100 are configured or adapted to be crushable and/or collapsible. In embodiments, one or more of the side plates 80, the vertical tubes 82, the cross tubes 84, the top cross plates 86, the back cross plates 88, the angle plates 90, the bolt plates 92, the bottom cross plates 94, the back vertical plates 96, the back horizontal plates 98, and/or the back tube plates 100 may be made of one or more materials that may have or exhibit one or more crushable and/or collapsible properties. As a result, the crushability and/or collapsibility of the bulkhead 36 may be facilitated by the one or more crushable and/or collapsible properties of the side plates 80, the vertical tubes 82, the cross tubes 84, the top cross plates 86, the back cross plates 88, the angle plates 90, the bolt plates 92, the bottom cross plates 94, the back vertical plates 96, the back horizontal plates 98, and/or the back tube plates 100. In an embodiment, the crushability and/or collapsibility of the bulkhead 36 may be facilitated by the one or more crushable and/or collapsible properties of at least the vertical tubes 82, the cross tubes 84, the top cross plates 86, the back cross plates 88, and/or at least one combination thereof.

In embodiments, the bulkhead 36 may comprise one or more honeycomb structures having the one or more crushable and/or collapsible properties. As a result, the one or more honeycomb structures may facilitate the crushability and/or collapsibility of the bulkhead 36. In embodiments, the one or more honeycomb structures of the bulkhead 36 may include and/or comprise at least one of the vertical tubes 82, the cross tubes 84, the top cross plates 86, the back cross plates 88, the back tube plates 100, or at least one combination thereof. In an embodiment, the one or more honeycomb structures of the bulkhead 36 may comprise or consist of at least one selected from the vertical tubes 82, the cross tubes 84, the back cross plates 88, or at least one combination thereof. The vertical tubes 82, the cross tubes 84, and/or the back cross plates 88 may be made of one or more materials that provide or exhibit the one or more crushable and/or collapsible properties. At least a portion of the bulkhead 36 may be made of one or more materials having or exhibiting the one or more crushable and/or collapsible properties.

FIGS. 10C and 10D illustrate one of the side plates 80 of the bulkhead 36, wherein a height of the side plate 80 is greater than a length of the side plate 80 and the length of the side plate 80 is greater than a thickness of the side plate 80. In embodiments, the height of the side plate 80 changes or varies along the length of the side plate 80. Surfaces of the height and the length of the side plate 80 may form an angle and the angle may be greater than about 90 degrees, more than about 120 degrees, about 140 degrees, or less than about 150 degrees.

FIGS. 10E and 10F illustrate one of the vertical tubes 82 of the bulkhead 36, wherein a length of the vertical tubes 82 is greater than a height of the vertical tubes 82 and the height of the vertical tubes 82 is greater than a wall thickness of the vertical tubes 82.

FIGS. 10G and 10H illustrate one of the cross tubes 84 of the bulkhead 36, wherein a length of the cross tubes 84 is greater than a height of the cross tubes 84 and the height of the cross tubes 84 is greater than a wall thickness of the cross tubes 84.

FIGS. 10I and 10J illustrate one of the top cross plates 86 of the bulkhead 86, wherein a length of the top cross plate 86 is greater than a height of the top cross plate 86 and the height of the top cross plate 86 is greater than a thickness of the top cross plate 86.

FIGS. 10K and 10L illustrate one of the back cross plates 88 of the bulkhead 36, wherein a length of the back cross plate 88 is greater than a height of the back cross plate 88 and the height of the back cross plate 88 is greater than a thickness of the back cross plate 88.

FIGS. 10M and 10N illustrate one of the angle plates 90 of the bulkhead 36, wherein a length of the angle plate 90 is greater than a height of the angle plate 90 and the height of the angle plate 90 is greater than a wall thickness of the angle plate 90.

FIGS. 10O and 10P illustrate one of the bolt plates 92 of the bulkhead 36, wherein a length of the bolt plate 92 is greater than a height of the bolt plate 92 and the height of the bolt plate 92 is greater than a thickness of the bolt plate 92. The bolt plates 92 may have openings formed through the thickness of the bolt plates 92 for securing, fastening, connecting, and/or attaching the bolt plates 92 and/or the bulkhead 36 to the deck 16, the decking 18, and/or the trailer 10.

FIGS. 10Q and 10R illustrates one of the bottom cross plates 94 of the bulkhead 36, wherein a length of the bottom cross plate 94 is greater than a height of the bottom cross plate 94 and the height of the bottom cross plate 94 is greater than a thickness of the bottom cross plate 94. In embodiments, one or more corners of a perimeter of the bottom cross plate 94 may have or comprise a cut-away area or a groove formed therein.

FIGS. 10S and 10T illustrate one of the back vertical plates 96 of the bulkhead 36, wherein a height of the back vertical plates 96 is greater than a length of the back vertical plates 96 and the length of the back vertical plates 96 is greater than a thickness of the back vertical plates 96.

FIGS. 10U and 10V illustrate one of the back horizontal plates 98 of the bulkhead 36, wherein a length of the back horizontal plate 98 is greater than a height of the back horizontal plate 98 and the height of the back horizontal plate 98 is greater than a thickness of the back horizontal plate 98.

FIG. 10W illustrates one of the back tube plates 100 of the bulkhead 36, wherein a length of the back tube plate 100 is greater than a height of the back tube plate 100 and the height of the back tube plate 100 is greater than a thickness of the back tube plate 100.

Figure 11:
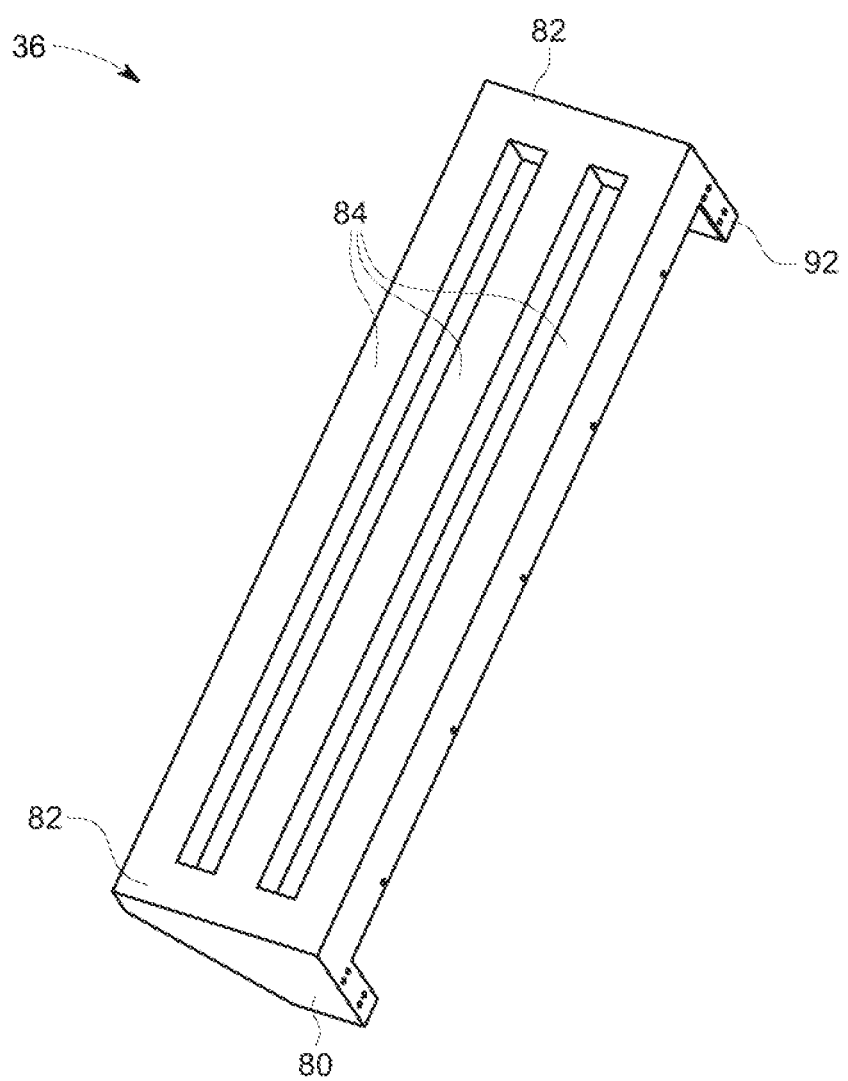
FIG. 11 is a front perspective view of a collapsible and/or crushable bulkhead in accordance with embodiments disclosed herein.

In FIG. 11, the bulkhead 36 may comprise the side plates 80 secured, fastened, connected, and/or attached together to each other via the vertical tubes 82 and/or the cross tubes 84. The bulkhead 36 may also comprise the bolt plates 92 for securing, fastening, connecting, and/or attaching the bulkhead 36 to the trailer 10. As a result, the vertical tubes 82 and/or the cross tubes 84 may be disposed or positioned between the side plates 80 and/or the bolt plates 92.

Figure 12:
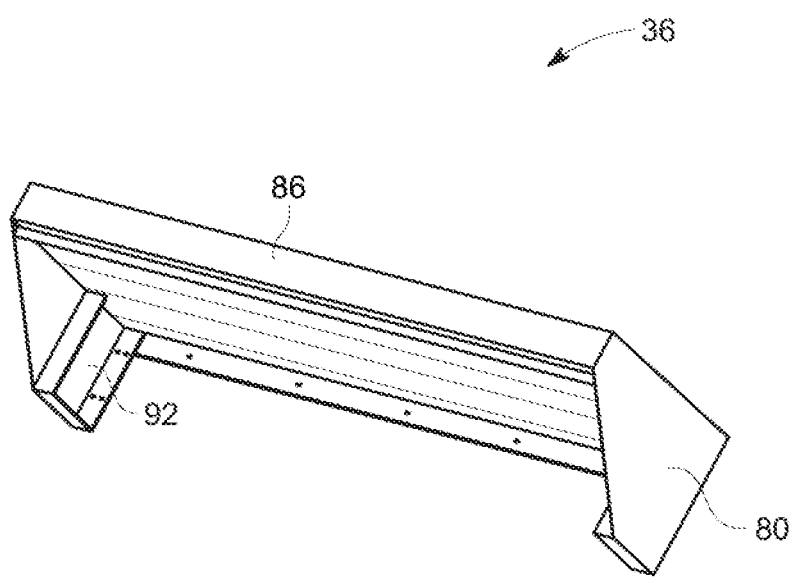
FIG. 12 is a rear perspective view of a collapsible and/or crushable bulkhead in accordance with embodiments disclosed herein.

In FIG. 12, the bulkhead 36 may comprise the side plates 80 secured, fastened, and/or connected together to each other via the top cross plate 86 and/or the bolt plates 92. As a result, the top cross plate 86 and/or the bolt plates 92 may be disposed or positioned between the side plates 80.

The present systems and/or methods disclosed herein may comprise the trailer 10, with the lowered center of gravity, having the devices 28 disposed or positioned on the deck 16 of the trailer 10 and/or the bulkhead 36 disposed or positioned on the deck 16 of the trailer 10. In embodiments, the trailer 10 is adapted, configured, constructed, and/or designed in such a manner as to lower the center of gravity for the load(s) disposed or positioned upon the trailer 10 in order to reduce the risk of the load(s) leaving the trailer 10 during routine and emergency driving maneuvers. As a result, the trailer 10 may improve the safety of the traveling public as well as driver of the truck. To accomplish this, the deck 16 of the trailer 10 may be lowered to a bottom edge 22 of the rails 20 of the trailer 10. As a result, the center of gravity may be lower additional side-to-side containment for the load(s) and the devices 28 may be provided at, near, and/or adjacent to the deck 16 of the trailer 10.

In embodiments, the trailer 10 may have, comprise, and/or include at least one of the tarp system 24, the stairs 40, the beams 38, the rails 20, the fasteners 32, the devices 28, the bulkhead 36, the fastener locations 34, the decking 16, the grab rails 44, and/or a combination thereof. In embodiments, the tarp system 24 may be retractable or moveable by hand and/or by rotatable mechanism and the beams 38 may be more than one load bearing beam. In an embodiment, the beams 38 may comprise one or more welded beams which may be I-beams, box beams, or a combination thereof. In embodiments, the devices 28 and/or the bulkhead 36 may be secured, fastened, connected, and/or attached to the deck 16 and/or the trailer 10 via at least one fastener selected from at least one pin, at least one bolt, at least one screw, at least one nail, at least one rivet, at least one adhesive or epoxy, at least one flange, at least one rod, at least one insert, and a combination thereof.

In embodiments, the decking 18 may be made of at least one first material and an optional second material. In embodiments, the at least one first material and/or the optional second material may comprise a fibrous material, a metal material, a composite material, or a combination thereof. In embodiments, the fibrous material may comprise, at least one wood material, such as, for example, oak, pine, apitogn, or a combination thereof. In embodiments, the metal material may comprise, aluminum, steel, or a combination thereof.

In embodiments, the composite material of the decking 18 may comprise a plastic, polymer, carbon-based material, or a combination thereof. In embodiments, the composite material made from two or more constituent materials with significantly different physical or chemical properties that, when combined, may produce a material with characteristics different from the individual components. In embodiments, the composition material of the decking 18 may comprise a composite wood, a reinforced plastic, a fiber-reinforced polymer or fiberglass, a ceramic matrix composite (which may comprise composite ceramic and metal matrices), a metal matrix composite, an advanced or specifically designed composite material, or a combination thereof.

In some embodiments, the trailer 10 may have, comprise, and/or include at least one retractable tarp disposed within tarp system 24, the stairs 40, at least one I-beam, one or more welded I-beams of the beams 38, the grab rails 44, one or more elevated edges of the rails 20, the fasteners 32, fastener locations 34 for receiving pins, the deck 16, the decking 18, and/or one or more combinations thereof.

In embodiments, the devices 28 may be or may comprise chocks that may be adapted, configured, constructed, and/or designed in such a way as to allow for easy location and relocation by a single person, typically the driver. In embodiments, the devices 28 and/or the chocks are movable and may be secured to the deck 16 using drop-in-pins (hereinafter "pins") that may be an appropriate size, material, and construction to withstand the forces involved in emergency maneuvers and ensure that they remain stationary. As a result, the safety of the traveling public as well as the driver of the truck may be increased and/or improved.

In embodiments, the devices 28 and/or the chocks may have the same, substantially the same, and/or different lengths, widths, heights, and/or sizes. In embodiments, one or more of the devices 28 and/or the chocks may comprise one or more of the following components: the bottom plates 50; the first and second main side plates 52, 54; the plate tubes 56; the inner horizontal plates 58; the inner vertical plate 60; the side small plates 62; the first and second inner small plates 64, 66; the roll blocks 68; the roll base plates 70, the first and second roll block retainers 72, 74, and/or one or more combinations thereof. The components of the devices 28 and/or the chocks may be connected, attached, fastened, secured, pinned, molded, welded, bolted, formed to each other. In an embodiment, one or more of the components of the devices 28 and/or the chocks may be formed by additive manufacturing, welding, extruding, and/or forging techniques.

In embodiments, the bulkhead 36 may be a lightweight and strong barrier disposed and/or positioned at the front end 12 of the trailer 10. In embodiments, the bulkhead 36 may be and/or comprise the one or more honeycomb structures and/or may be made of one or more composite material(s). The bulkhead 36 may reduce, retard, restrict, and/or prevent forward momentum of a typical load in the event of an emergency stop or a crash in which the devices 28 and/or the chocks and a load is propelled forward toward the truck and the driver. The bulkhead 36 may be adapted, configured, constructed and/or designed to slow or stop the load and/or objects by collapsing or crushing, thereby dissipating the kinetic energy of the moving load and/or objects to a level that can be contained by the remain portions of the bulkhead 36. As a result, safety of the traveling public as well as the driver of the truck and the trailer 10 may be increased and/or improved.

In embodiments, the bulkhead 36 may comprise one or more of the following components: the side plates 80; the vertical tubes 82; the cross tubes 84; the top cross plates 86; the back cross plates 88; the angle plates 90; the bolt plates 92; the bottom cross plates 94; the back vertical plates 96, the back horizontal plates 98, the back tube plates 100, and/or one or more combinations thereof. One or more of the components of the bulkhead 36 may be connected, attached, fastened, secured, pinned, molded, welded, bolted, formed to each other. In an embodiment, one or more of the components of the bulkhead 36 may be formed by additive manufacturing, welding, extruding, and/or forging techniques.

In embodiments, any number of the components of the trailer 10, the devices 28 and/or the chocks, and/or the bulkhead 36 may be integrally formed together and/or may be connected, attached, fastened, secured, pinned, molded, welded, bolted, formed to each other. Any number of the components of the trailer 10, the devices 28 and/or the chocks, and/or the bulkhead 36 may be formed by one or more additive manufacturing, welding, extruding, and/or forging techniques.

In embodiments, any number of the components of the trailer 10, the devices 28 and/or the chocks, and/or the bulkhead 36 may be made of an alloy material. In embodiments, the alloy material may be a hardened alloy, a pre-tempered alloy, or a combination thereof. In embodiments, the alloy material may comprise at least one selected from aluminum, magnesium, silicon, or a combination thereof. In an embodiment, the alloy material may be a precipitation-hardened aluminum alloy containing magnesium, silicon, or a combination thereof. For example, the alloy material may be 6061 aluminum alloy.

Additional novel and inventive components disclosed herein may be incorporated into or included in the trailer 10, the devices 28 and/or the chocks, and/or the bulkhead 36 disclosed herein. Further, novel and inventive methods disclosed herein may be utilized to produce or provide the trailer 10, the devices 28 and/or the chocks, and/or the bulkhead 36 disclosed herein to increase and/or improve safety of the traveling public as well as the driver of the truck and the trailer 10.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:
1. A flatbed trailer system comprising:
a trailer comprising:
   a total length defined between a front end and a rear end located opposite with respect to the front end of the trailer
   a total width defined between a first side and a second side located opposite with respect to the first side of the trailer; and
   a deck or a decking disposed on a top side of the trailer and along at least a portion of the length of trailer; and
a bulkhead connected to the top side of the trailer, disposed adjacent to the front end of the trailer, and comprising:
   a first side plate;
   a second side plate; and
   at least one crushable and/or collapsible structure disposed between the first side plate and the second side plate such that the at least one crushable and/or collapsible structure connects the first side plate to the second side plate,
   wherein
   at least a portion of the at least one crushable and/or collapsible structure is made of one or more materials having at least one of a crushable property and a collapsible property; and
   the at least one crushable and/or collapsible structure comprises cross tubes extending between the first side plate and the second side plate such that the cross tubes extend across at least a portion of the width of the trailer.

2. The flatbed trailer system of claim 1, wherein the bulkhead further comprises:
    at least one vertical tube disposed between the cross tubes and the first plate.
3. The flatbed trailer system of claim 1, wherein the cross tubes comprises at least three cross tubes.
4. The flatbed trailer system of claim 1, wherein the bulkhead further comprises:
    at least one cross plate connecting the cross tubes together such that at least one void or space is provided between each cross tube of the cross tubes.
5. The flatbed trailer system of claim 3, wherein the at least one void or space faces away from the rear end of the trailer.
6. The flatbed trailer system of claim 3, wherein the bulkhead further comprises:
    at least one vertical tube disposed between the at least one cross plate and the first plate.
7. The flatbed trailer system of claim 1, wherein the bulkhead further comprises:
    a bolt plate connecting the first side plate to the deck or the decking of the trailer.
8. A flatbed trailer system comprising:
    a trailer comprising:
        a total length defined between a front end and a rear end located opposite with respect to the front end of the trailer
        a total width defined between a first side and a second side located opposite with respect to the first side of the trailer; and
        a deck or a decking disposed on a top side of the trailer and along at least a portion of the length of trailer; and
    a load placement device connected to the top side of the trailer, disposed between the front end and the rear end of the trailer, and comprising:
        a bottom plate configured for fastening the load placement device to the deck or the decking of the trailer;
        an inner plate connected to the bottom plate; and
        at least one pair of roll blocks connected to the inner plate such that the inner plate is disposed between the bottom plate and the at least one pair roll blocks, wherein
            at least one void or space is disposed between the at least one pair of roll blocks and configured to receive a load and maintain the load at a distance away from the deck or the decking of the trailer,
            at least one surface of the at least one pair of roll blocks is angled with respect to the bottom plate and the inner plate and configured to contact the load, when the load has been received by the at least one pair of roll blocks,
            each roll block of the at least one pair of roll blocks comprises:
                a base plate having a surface facing away from the bottom plate of the load placement device;
                first block retainers disposed on the surface of the base plate; and
                second block retainers disposed on the surface of the base plate, and
                the first and second block retainers form the at least one surface that is angled with respect to the bottom plate and the inner plate and configured to contact the load, when the load has been received by the at least one pair of roll blocks.

9. The flatbed trailer system of claim 8, wherein the top side of the trailer comprises fastener locations for connecting the load placement device to the trailer.
10. The flatbed trailer system of claim 9, further comprising:
    at least one fastener engaging the bottom plate of the load placement device and a fastener location of the fastener locations such that the at least one fastener connects the load placement device to the trailer.
11. The flatbed trailer system of claim 8, wherein the load placement device extends across at least a portion of the total width of the trailer.
12. The flat bed trailer system of claim 8, wherein each roll block of the at least one pair of roll blocks is a chock.
13. The flat bed trailer system of claim 8, wherein the at least one void or space is V-shaped.
14. The flatbed trailer system of claim 8, wherein each roll block of the at least one pair of roll blocks is a chock comprising the base plate and the first and second block retainers.
15. A method of improving safety associated with transporting a load on a flatbed trailer, the method comprising:
    disposing a crushable and/or collapsible bulkhead at a front end of a flatbed trailer, wherein the crushable and/or collapsible bulkhead comprises cross tubes extending across at least a portion of a total width of the flatbed trailer and the cross tubes are made of one or more materials having at least one of a crushable property and a collapsible property;
    disposing a load placement device on a deck of the flatbed trailer between the front end of the flatbed trailer and an opposite rear end of the flatbed trailer; and
    disposing a load into a void or space of the load placement device such that the load placement device maintains a distance between the deck of the flatbed trailer and the load.
16. The method of claim 15, wherein the load placement device comprises a pair of chocks.
17. A flatbed trailer system comprising:
    a trailer comprising:
        a total length defined between a front end and a rear end located opposite with respect to the front end of the trailer
        a total width defined between a first side and a second side located opposite with respect to the first side of the trailer; and
        a deck or a decking disposed on a top side of the trailer and along at least a portion of the length of trailer; and
    a bulkhead connected to the top side of the trailer, disposed adjacent to the front end of the trailer, and comprising:
        a first side plate;
        a second side plate; and
        at least one crushable and/or collapsible structure disposed between the first side plate and the second side plate such that the at least one crushable and/or collapsible structure connects the first side plate to the second side plate,
        wherein
            at least a portion of the at least one crushable and/or collapsible structure is made of one or more materials having at least one of a crushable property and a collapsible property, and
            the one or more materials are selected from the group consists of at least one of a hardened alloy, a pre-tempered alloy, and a combination thereof.

18. The flatbed trailer system of claim 17, wherein the one or more materials are selected from the group consisting of at least one of aluminum, magnesium, silicon, and a combination thereof.

19. A flatbed trailer system comprising:
- a trailer comprising:
  - a total length defined between a front end and a rear end located opposite with respect to the front end of the trailer
  - a total width defined between a first side and a second side located opposite with respect to the first side of the trailer; and
  - a deck or a decking disposed on a top side of the trailer and along at least a portion of the length of trailer;
- a load placement device connected to the top side of the trailer, disposed between the front end and the rear end of the trailer, and comprising:
  - a bottom plate configured for fastening the load placement device to the deck or the decking of the trailer;
  - an inner plate connected to the bottom plate; and
  - at least one pair of roll blocks connected to the inner plate such that the inner plate is disposed between the bottom plate and the at least one pair roll blocks, wherein at least one void or space is disposed between the at least one pair of roll blocks and configured to receive a load and maintain the load at a distance away from the deck or the decking of the trailer, wherein at least one surface of the at least one pair of roll blocks is angled with respect to the bottom plate and the inner plate and configured to contact the load, when the load has been received by the at least one pair of roll blocks; and
- a crushable and/or collapsible bulkhead connected to the top side of the trailer, disposed adjacent to the front end of the trailer, and comprising cross tubes extending across at least a portion of the total width of the trailer.

* * * * *